(12) United States Patent
Hino

(10) Patent No.: US 10,843,074 B2
(45) Date of Patent: Nov. 24, 2020

(54) OBJECT MOVEMENT CONTROL APPARATUS, STORAGE MEDIUM STORING OBJECT MOVEMENT CONTROL PROGRAM, AND OBJECT MOVEMENT CONTROL METHOD

(75) Inventor: Takanori Hino, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 2261 days.

(21) Appl. No.: 11/367,426

(22) Filed: Mar. 6, 2006

(65) Prior Publication Data
US 2006/0267955 A1 Nov. 30, 2006

(30) Foreign Application Priority Data

May 16, 2005 (JP) .................... 2005-142857

(51) Int. Cl.
G06F 3/0488 (2013.01)
A63F 13/426 (2014.01)
A63F 13/2145 (2014.01)
A63F 13/92 (2014.01)
A63F 13/26 (2014.01)

(52) U.S. Cl.
CPC ........ *A63F 13/426* (2014.09); *A63F 13/2145* (2014.09); *G06F 3/04883* (2013.01); *A63F 13/26* (2014.09); *A63F 13/92* (2014.09); *A63F 2300/1043* (2013.01); *A63F 2300/1075* (2013.01); *A63F 2300/204* (2013.01); *A63F 2300/301* (2013.01); *A63F 2300/6045* (2013.01); *A63F 2300/8017* (2013.01)

(58) Field of Classification Search
CPC ............. G06F 3/03547; G06F 3/03545; G06F 2203/04108
USPC .................................. 345/173, 160, 55, 204
See application file for complete search history.

(56) References Cited

U.S. PATENT DOCUMENTS

| | | | | |
|---|---|---|---|---|
| 4,288,537 A | * | 9/1981 | Knetzger ...................... | 434/169 |
| 5,287,446 A | * | 2/1994 | Williams et al. ............. | 345/474 |
| 5,425,139 A | * | 6/1995 | Williams et al. ............. | 345/474 |
| 5,523,775 A | * | 6/1996 | Capps ........................... | 345/179 |
| 5,738,583 A | * | 4/1998 | Comas et al. ................. | 463/40 |
| 6,098,458 A | * | 8/2000 | French et al. ............. | 73/379.04 |
| 6,191,777 B1 | * | 2/2001 | Yasuhara ................ | A63F 13/02 345/173 |

(Continued)

FOREIGN PATENT DOCUMENTS

| | | |
|---|---|---|
| JP | 6-285259 | 10/1994 |
| JP | 10-28777 | 2/1998 |

(Continued)

OTHER PUBLICATIONS

Office Action for counterpart application JP2005-142857 dated Aug. 4, 2009.

*Primary Examiner* — William Boddie
*Assistant Examiner* — Alecia D English
(74) *Attorney, Agent, or Firm* — Nixon & Vanderhye P.C.

(57) ABSTRACT

A game apparatus includes an LCD, and a touch panel is provided in relation to the LCD. The LCD displays a game screen, and the player performs touch operations (sliding, click, etc.) on the touch panel with use of a stick to draw, correct and decide at random a moving path of an object. When the movement path of the object is decided and some point on the movement path is clicked, the object moves to the clicked position according to the movement path.

8 Claims, 15 Drawing Sheets

(56) References Cited

U.S. PATENT DOCUMENTS

| | | | |
|---|---|---|---|
| 6,402,616 B1* | 6/2002 | Ogata | A63F 13/06 345/156 |
| 6,473,069 B1* | 10/2002 | Gerpheide | G06F 3/03547 341/27 |
| 7,456,824 B2* | 11/2008 | Yoshimura | 345/173 |
| 2002/0039445 A1* | 4/2002 | Abe et al. | 382/199 |
| 2004/0167715 A1* | 8/2004 | Miwa | 701/213 |
| 2004/0254019 A1* | 12/2004 | Riendeau | A63F 3/081 463/42 |
| 2005/0197186 A1* | 9/2005 | Ohta | A63F 13/06 463/30 |
| 2008/0048997 A1* | 2/2008 | Gillespie | G06F 3/03547 345/174 |

FOREIGN PATENT DOCUMENTS

| | | |
|---|---|---|
| JP | 11-86024 | 3/1999 |
| JP | 2000-24306 A | 1/2000 |

* cited by examiner

OBJECT MOVEMENT CONTROL APPARATUS, STORAGE MEDIUM STORING OBJECT MOVEMENT CONTROL PROGRAM, AND OBJECT MOVEMENT CONTROL METHOD

CROSS REFERENCE OF RELATED APPLICATION

The disclosure of Japanese Patent Application No. 2005-142857 is incorporated herein by reference.

TECHNICAL FIELD

Field of the Invention

Certain exemplary embodiments relate to an object movement control apparatus, a storage medium storing an object movement control program, and an object movement control method. More specifically, certain exemplary embodiments relate to an object movement control apparatus, a storage medium storing an object movement control program, and an object movement control method, which move a movable object to a target position in accordance with a player's operation.

BACKGROUND AND SUMMARY

One example of this kind of conventional object movement control apparatus is disclosed in Japanese Patent Laying-open NO. 6-285259 [A63F 9/22] (document 1) laid-open on Oct. 11, 1994-. According to document 1, the screen of a television set displays the entire map of a battle field in a simulation game or the like in which battle means including combat vehicles, airplanes, helicopters, troops, etc. capable of being operated by an operator and the movable ranges of the battle means are provided. In addition, one part of the entire map containing the movable ranges of the battle means is displayed on a liquid crystal controller. In moving a desired battle means, the operator firstly selects the battle means by touching it. Then, the movable range according to the performance of the selected battle means is clearly shown with a change in color or the like. Then, when the operator touches a position to which the battle means is to be moved (desired movement position), the battle means moves from the previous position (existing position) to the desired movement position.

Also, another example of this kind of conventional movement control apparatus is disclosed in Japanese Patent Laying-open No. 10-28777 [A63F 9/22, GO6F 3/033] (document 2) laid-open on Feb. 3, 1998. According to document 2, a desired object is moved by dragging it.

In accordance with document 1, the desired battle means can be moved by touch operation. However, screen switching takes place in such a manner that the battle means moves simply from the current position to the desired movement position, and thus this cannot show a realistic state in which the battle means is gradually heading toward the desired movement position. More specifically, the battle means such as a combat vehicle goes linearly from the current position to the desired movement position and thus it accomplishes its movement too easily even if there are any obstacles in its way.

In addition, according to document 2, the object can be moved by dragging it in such a manner as to avoid any obstacles. However, the movement of the object is based on a dragging operation and cannot be started over again. As a consequence, it is required to contemplate a movement path sufficiently in advance, but it is hard to determine the path in due consideration of land features and obstacles, only at a glance through the game screen.

SUMMARY OF THE INVENTION

Therefore, it is a feature of certain exemplary embodiments to provide a novel object movement control apparatus, storage medium storing an object movement control program and object movement control method.

It is another feature of certain exemplary embodiments to provide an object movement control apparatus, a storage medium storing an object movement control program, and an object movement control method, which make it possible easily devise a way to move an object.

An object movement control apparatus according to certain exemplary embodiments, comprises a display means for displaying a movable object, a pointing device provided in relation to the display means, an input detection means for detecting input coordinates input by the pointing device, a determination means for determining whether or not the input coordinates detected by the input detection means matches a display position of the movable object, a drawn locus creation means for, when result of the determination by the determination means shows that there is a match, creating a first locus according to the input coordinates continuously detected by the input detection means, and an object movement means for, after the drawn locus creation means has created the first locus and then the input detection means detects that the input of input coordinates has temporarily ceased, subsequent detection of the input of input coordinates by the input detection means indicates a first position on the first locus, moving the movable object from a start point of the first locus to the first position, in accordance with the first locus.

More specifically, the object movement control apparatus (10: reference numeral shown in "Detailed Description" provided later. The same applies to the following numerals.) comprises the display means (14) for displaying the movable object (102). The pointing device (22) is provided in relation to the display means (14). The input detection means (42, S5, S15, S21) detects input coordinates input by the pointing device (22). The determination means (42, S7) determines whether or not the input coordinates detected by the input detection means (42, S5, S15, S21) matches the display position of the movable object (102), that is, whether or not the input coordinates is contained in the display area of the movable object (102). When the result of the determination by the determination means (42, S7) shows that there is a match ("YES" in S7), the drawn locus creation means (42, S21, S25) creates the first locus according to the input coordinates continuously detected by the input detection means (42, S5, S15, S21). After the drawn locus creation means (42, S21, S25) has created the first locus and then the input detection means (42, S5, S15, S21) detects that the input of input coordinates has temporarily ceased ("YES" in S11), subsequent detection of the input of input coordinates by the input detection means (42, S5, S15, S21) indicates the first position on the first locus ("YES" in S29), that is, when the desired point on the first locus is designated, the object movement means (42, S55) moves the movable object (102) from the start point of the first locus to the first position, in accordance with the first locus.

According to certain exemplary embodiments, by designating a desired point on the drawn locus, the movable object can be moved from the start point to the desired point in accordance with the locus. This means that the movable object can be moved to a desired position along a desired path. In addition, even after the path has been already decided, it is possible to move the movable object only to a midway point on the path. As a consequence, the operator can easily devise his/her strategies.

In an aspect, certain exemplary embodiments further comprises a locus extension means for, after the drawn locus creation means has created the first locus and the input detection means detects that the input of input coordinates has temporarily ceased, subsequent detection of the input of input coordinates by the input detection means indicates a second position not on the first locus, extending the first locus from an end point of the first locus to the second position, in accordance with a predetermined rule. More specifically, after the drawn locus creation means (42, S21, S25) has created the first locus and the input detection means (42, S5, S15, S21) detects that the input of input coordinates has temporarily ceased ("YES" in S11), subsequent detection of the input of input coordinates by the input detection means (42, S5, S15, S21) indicates a second position not on the first locus ("NO" in S29), the locus extension means (42, S31) extends the first locus from an end point of the first locus to the second position, in accordance with a predetermined rule. In this manner, the already drawn path can be extended later, which allows the initial target position to be easily changed. That is, the player can easily change his/her strategies.

In another aspect, a certain exemplary embodiment further comprises a locus shortening means for, when the first position is a point other than the end point of the first locus, shortening the first locus so as to be from the start point to the first position. More specifically, when the first position is a point other than the end point of the first locus ("NO" in S47), the locus shortening means (42, S49) shortens the first locus so as to be from the start point to the first position. That is, the already drawn path can be shortened later. Therefore, by further extending the shortened path, a new path can be drawn with the use of the partly drawn path. This means that it is possible to easily change the target position or the path or the both.

In certain exemplary embodiments, after the locus shortening means shortens the first locus down to the first position, the drawn locus creation means extends the first locus based on the input coordinates continuously detected by the input detection means, and after the extended first locus has been created and the input detection means detects that the input of input coordinates has temporarily ceased, subsequent detection of the input of input coordinates by the input detection means indicates a third position on the extended first locus, the object movement means moves the movable object from the start point of the first locus to the third position, in accordance with the first locus. More specifically, after the locus shortening means (42, S49) shortens the first locus down to the first position, the drawn locus creation means (42, S21, S25) extends the first locus based on the input coordinates continuously detected by the input detection means (42, S5, S15, S21). That is, it is possible to draw a new path by using one part of the already drawn path. After the extended first locus has been created and the input detection means (42, S5, S15, S21) has detects that the input of input coordinates has temporarily ceased, subsequent detection of the input of input coordinates detected again by the input detection means (42, S5, S15, S21) indicates the third position on the extended first locus, the object movement means (42, S55) moves the movable object (102) from the start point of the first locus to the third position, in accordance with the first locus. In this manner, a new path can be drawn by using one part of the already drawn path. This means that it is possible to easily change the target position or the path or the both.

In still another aspect of certain exemplary embodiments, a plurality of the movable objects exist, a current position of one of the movable objects selected by the pointing device is the start point of the first locus, and the object movement means moves the selected one movable object in accordance with the first locus. More specifically, there are a plurality of the movable objects (102). Thus, the operator can select a desired movable object (102) from the plurality of movable objects (102) through the pointing device (22). The start point of the first locus is decided as current position of the selected movable object (102). Therefore, the object movement means (42, S55) moves the selected movable object (102) in accordance with the first locus. In this manner, by selecting one movable object from the plurality of movable objects, the player can move the desired movable object under his/her strategy.

In further another aspect, a certain exemplary embodiment further comprises an allowable movement range determination means for determining whether or not the first locus exceeds an allowable movement range of the movable object, and a locus decision means for, when the first locus exceeds the allowable movement range of the movable object, deciding a second locus different from the first locus, which links the start point with a fourth position corresponding to current input coordinates detected by the input detection means, in accordance with a predetermined rule. More specifically, the allowable movement range determination means (42, S23, S33) determines whether or not the first locus exceeds an allowable movement range of the movable object (102). When the first locus exceeds the allowable movement range of the movable object (102), the locus decision means (42, S23, S33) decides the second locus that links the start point with the fourth position corresponding to current input coordinates detected by the input detection means (42, S5, S15, S21), in accordance with the predetermined rule. However, the second path is different from the first path. That is, if the path's length exceeds the allowable movement range of the movable object, another path is decided according to the predetermined rule, which allows the operator to contrive a path on which the object can move within the allowable movement range.

In another embodiment, a certain exemplary embodiment further comprises a locus erase means for erasing the first locus when the locus decision means decides the second locus. More specifically, the locus erase means (42, S37) erases the first locus when the locus decision means decides the second locus. That is, the path exceeding the allowable movement range is erased as another path is decided, which causes no confusion for the operator in deciding a path.

A storage medium for storing an object movement control program according to certain exemplary embodiments stores an object movement control program for an object movement control apparatus comprising a display means for displaying a movable object and a pointing device provided in relation to the display means. The object movement control program causes a processor of the object movement control apparatus to execute an input detection step, a determination step, a drawn locus creation step and an object movement step. In the input detection step, input coordinates input by the pointing device are detected. In the determination step, it is determined whether or not the input coordinates detected in the input detection step matches a display position of the movable object. In the drawn locus creation step, when result of the determination in the determination step shows that there is a match, a first locus is created according to the input coordinates continuously detected in the input detection step. In the object movement step, after the first locus has been created in the drawn locus creation step and the input detection step has detected nodetects that the input of input coordinates has temporarily ceased, when somosubsequent detection of the input of input coordinates detected again in the input detection step indicates a first position on the first locus, the movable object is moved from a start point of the first locus to the first position, in accordance with the first locus.

According to certain exemplary embodiments of the object movement control apparatus discussed above, a storage medium for storing an object movement control program also allows the operator to move the movable object to a desired position along a desired path and develop his/her strategies for that easily.

An object movement control method according to certain exemplary embodiments is an object movement control method for an object movement control apparatus comprising a display means for displaying a movable object, a pointing device provided in relation to the display means and an input detection means for detecting coordinates input by the pointing device. By the object movement control method, (a) it is determined whether or not the input coordinates detected by the input detection means matches a display position of the movable object, (b) when result of the determination in the step (a) shows that there is a match, a first locus is created according to the input coordinates continuously detected by the input detection means, and (c) after the first locus has been created in the step (b) and the input detection means detects that the input of input coordinates has temporarily ceased, subsequent detection of the input of input coordinates by the input detection means indicates a first position on the first locus, the movable object is moved from a start point of the first locus to the first position, in accordance with the first locus.

According to certain exemplary embodiments of the object movement control apparatus discussed above, a storage medium for storing an object movement control program also allows the operator to move the movable object to a desired position along a desired path and develop his/her strategies for that easily.

The above described features, aspects and advantages of certain exemplary embodiments will become more apparent from the following detailed description certain exemplary embodiments when taken in conjunction with the accompanying drawings.

DETAILED DESCRIPTION

Figure 1:
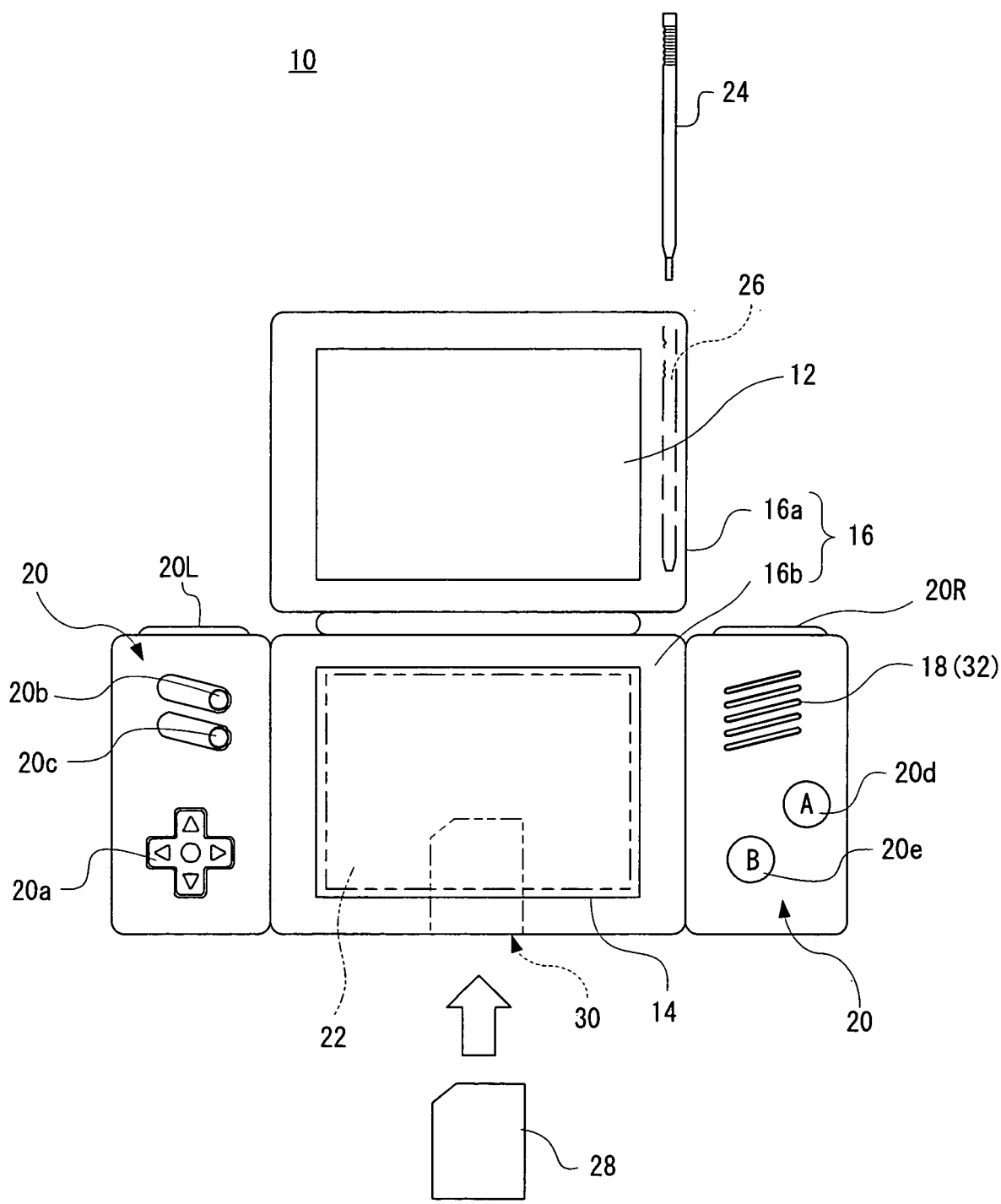
FIG. 1 is an illustrative view showing one example of a game apparatus of a certain exemplary embodiment.

Referring to FIG. 1, a game apparatus 10 of a certain exemplary embodiment stores an object movement control program and functions as an object movement control apparatus. This game apparatus 10 includes a first liquid crystal display (LCD) 12 and a second LCD 14. The LCD 12 and the LCD 14 are stored in a housing 16 so as to be located in predetermined positions. In this embodiment, the housing 16 is formed by an upper housing 16a and a lower housing 16b. The LCD 12 is stored in the upper housing 16a and the LCD 14 is stored in the lower housing 16b. Accordingly, the LCD 12 and the LCD 14 are closely arranged in such a manner to line up vertically (above and below).

Some LCDs are used as displays in this embodiment, and alternatively, EL (Electronic Luminescence) displays and plasma displays may be employed in place of the LCDs.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Furthermore, the lower housing 16b is provided with a sound hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It is noted that the upper housing 16a and the lower housing 16b are not necessarily rotatably connected with each other, and may alternatively be provided integrally (fixedly) to form the housing 16.

The operating switch 20 includes a direction instructing switch (cross switch) 20*a*, a start switch 20*b*, a select switch 20*c*, an action switch (A button) 20*d*, an action switch (B button) 20*e*, an action switch (L button) 20L, and an action switch (R button) 20R. The switches 20*a*, 20*b* and 20*c* are placed at the left of the LCD 14 on the one main surface of the lower housing 16*b*. Also, the switches 20*d* and 20*e* are placed at the right of the LCD 14 on the one main surface of the lower housing 16*b*. Furthermore, the switches 20L and 20R are placed in a part of an upper edge (top surface) of the lower housing 16*b* at a place except for a connected portion, and lie of each side of the connected portion with the upper housing 16*a*.

The direction instructing switch 20*a* functions as a digital joystick, and is utilized for instructing a moving direction of a player character (or player object) to be operated by an operator (player), instructing a moving direction of a cursor, and so forth by operating any one of four depression portions. The start switch 20*b* is formed by a push button, and is utilized for starting (restarting), temporarily stopping (pausing) a game, and so forth. The select switch 20*c* is formed by the push button, and utilized for a game mode selection, etc.

The action switch 20*d*, that is, the A button is formed by the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 20*e*, that is, the B button is formed by the push button, and is utilized for changing a game mode selected by the select switch 20*c*, canceling an action determined by the A button 20*d*, and so forth.

The action switch (left push button) 20L and the action switch (right push button) 20R are formed by the push button, and the left push button (L button) 20L and the right push button (R button) 20R can perform the same operation as the A button 20*d* and the B button 20*e*, and also function as a subsidiary of the A button 20*d* and the B button 20*e*.

Also, on a top surface of the LCD 14, a touch panel 22 is provided. As the touch panel 22, any one of kinds of a resistance film system, an optical system (infrared rays system) and an electrostatic capacitive coupling system, for example, can be utilized. In response to an operation of depressing, stroking or touching with a stick 24, a pen (stylus pen), or a finger (hereinafter, referred to as "stick 24, etc.") on a top surface (detection surface) of the touch panel 22, the touch panel 22 detects coordinates of position of operation by means of the stick 24, etc. and outputs coordinate data corresponding to the detected coordinates.

In this embodiment, a resolution of the display surface of the LCD 14 is 256 dots×192 dots, and a detection accuracy of a detection surface of the touch panel 22 is also rendered 256 dots×192 dots in correspondence to the resolution of the display surface (this is the same or approximately the same as for the LCD 12). However, detection accuracy of the detection surface of the touch panel 22 may be lower than the resolution of the display surface of the LCD 14, or higher than it.

The LCD 12 and the LCD 14 can display different game images (game screens). For example, in a racing game, it is possible to display on the one LCD a screen viewed from a driving seat of a vehicle or images of the vehicle followed and photographed by a camera behind or above it, and display a screen of entire race (course) on the other LCD. Furthermore, in the RPG, characters such as a map, a player character, etc. are displayed on the one LCD, and items belonging to the player character may be displayed on the other LCD. Moreover, a play screen for a game may be displayed on one LCD (e.g. the LCD 12) and a game screen containing text information, icons and the like for operating the game (operating screen) may be displayed on the other LCD (e.g. the LCD 14). Furthermore, by using the two LCD 12 and LCD 14 as one screen, it is possible to display a big monster (enemy character) to be defeated by the player character.

This allows the player to point at (specify) or make active (move) character images displayed on the LCD 14, such as player characters, enemy characters, item characters, text information and icons, or select a command, by operating the touch panel 22 with the stick 24, etc. Besides, this also makes it possible to change an orientation of a virtual camera (viewpoint) provided in the three-dimensional game space or scroll through a game screen (game map) (the screen is displayed in a state of being gradually moved).

As stated above, the game apparatus 10 has the LCD 12 and the LCD 14 as a display portion of two screens, and by providing the touch panel 22 on an upper surface of any one of them (LCD 14 in the first embodiment), the game apparatus 10 has the two screens (LCD 12, 14) and the two operating portions (20, 22).

Additionally, in this embodiment, the stick 24 can be stored in a housing portion (housing slot) 26 provided in proximity to a side surface (right side surface) of the upper housing 16*a*, for example, and taken out therefrom as necessary. However, in a case of not preparing the stick 24, it is not necessary to provide the housing portion 26.

Also, the game apparatus 10 includes a memory card (or game cartridge) 28, and the memory card 28 is detachable, and inserted into a loading slot 30 provided on a rear surface or a lower edge (bottom surface) of the lower housing 16*b*. Although omitted in FIG. 1, a connector 46 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 42 (see FIG. 2) of the game apparatus 10.

Although not illustrated in FIG. 1, a speaker 32 (see FIG. 2) is provided at a position corresponding to the sound hole 18 inside the lower housing 16*b*.

Furthermore, although omitted in FIG. 1, for example, a battery accommodating box is provided on a rear surface of the lower housing 16*b*, and a power switch, a volume switch, an external expansion connector, an earphone jack, etc. are provided on a bottom surface of the lower housing 16*b*.

Figure 2:
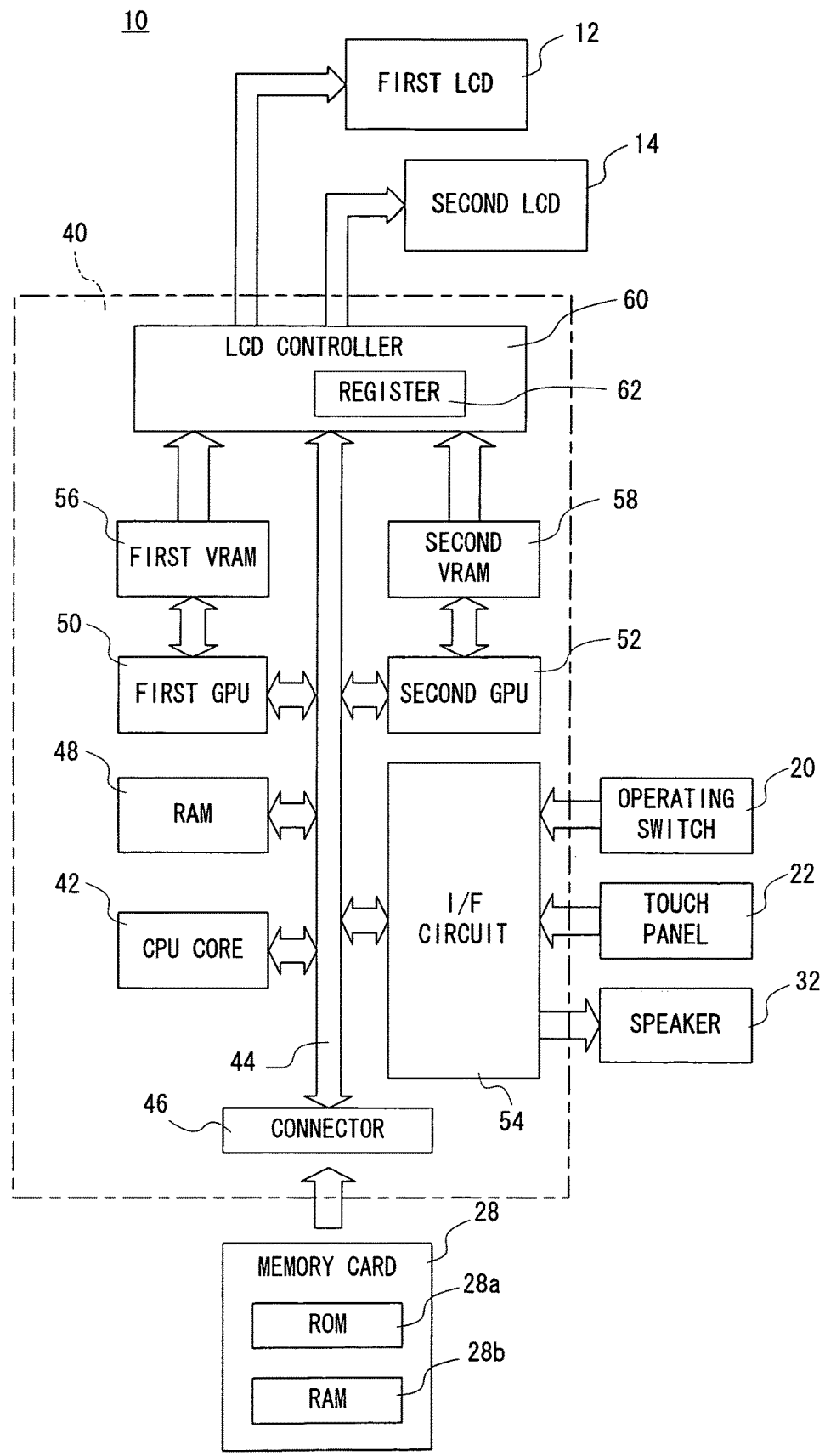
FIG. 2 is a block diagram showing electric configuration of the game apparatus shown in FIG. 1.

FIG. 2 is a block diagram showing an electric configuration of the game apparatus 10. Referring to FIG. 2, the game apparatus 10 includes an electronic circuit board 40, and on the electronic circuit board 40, a circuit component such as a CPU core 42, etc. is mounted. The CPU core 42 is connected to the connector 46 via a bus 44, and is connected with a RAM 48, a first graphics processing unit (GPU) 50, a second GPU 52, an input-output interface circuit (hereinafter, referred to as "I/F circuit") 54, and an LCD controller 60.

The connector 46 is detachably connected with the memory card 28 as described above. The memory card 28 includes a ROM 28*a* and a RAM 28*b*, and although illustration is omitted, the ROM 28*a* and the RAM 28*b* are connected with each other via a bus and also connected with a connector (not shown) to be connected with the connector 46. Accordingly, the CPU core 42 gains access to the ROM 28*a* and the RAM 28*b* as described above.

The ROM 28*a* stores in advance a game program for a virtual game (golf game in this embodiment) to be executed by the game apparatus 10, image (character image, background image, item image, icon (button) image, message image, etc.) data, data of the sound (music) necessary for the game (sound data), etc. The RAM (backup RAM) 28*b* stores (saves) proceeding data and result data of the game.

The RAM 48 is utilized as a buffer memory or a working memory. That is, the CPU core 42 loads the game program, the image data, the sound data, etc. stored in the ROM 28*a* of the memory card 28 into the RAM 48, and executes the loaded game program. The CPU core 42 executes a game process while storing in the RAM 48 data (game data and flag data) temporarily generated in correspondence with a progress of the game.

Besides, such the game program, the image data, the sound data, etc. are loaded from the ROM 28*a* entirely at a time, or partially and sequentially so as to be stored (loaded) into the RAM 48.

Each of the GPU 50 and the GPU 52 forms a part of a rendering means, is constructed by, for example, a single chip ASIC, and receives a graphics command (graphics command) from the CPU core 42 to generate game image data according to the graphics command. However, the CPU core 42 provides each of the GPU 50 and the GPU 52 with an image generating program (included in the game program) required for generation of the game image data in addition to the graphics command.

Furthermore, the GPU 50 is connected with a first video RAM (hereinafter, referred to as "VRAM") 56, and the GPU 52 is connected with a second VRAM 58. The GPU 50 and the GPU 52 obtain data required for the GPU 50 and the GPU 52 to execute the graphics command (image data: character data, texture data, etc.) by access to a first VRAM 56 and a second VRAM 58, respectively. Also, the CPU core 42 writes the image data required for graphics drawing into the first VRAM 56 and the second VRAM 58 via the GPU 50 and the GPU 52. The GPU 50 accesses the VRAM 56 to generate the game image data for graphics drawing, and the GPU 52 accesses the VRAM 58 to generate the game image data for graphics drawing.

The VRAM 56 and the VRAM 58 are connected to the LCD controller 60. The LCD controller 60 includes a register 62, and the register 62 consists of, for example, one bit, and stores a value of "0" or "1" (data value) according to an instruction of the CPU core 42. In a case that the data value of the register 62 is "0", the LCD controller 60 outputs the game image data generated by the GPU 50 to the LCD 12, and outputs the game image data generated by the GPU 52 to the LCD 14. Furthermore, in a case that the data value of the register 62 is "1", the LCD controller 60 outputs the game image data generated by the GPU 50 to the LCD 14, and outputs the game image data generated by the GPU 52 to the LCD 12.

Besides, the LCD controller 60 reads out game image data directly from the VRAM 56 and the VRAM 58, and reads out game image data from the VRAM 56 and the VRAM 58 via the GPU 50 and the GPU 52.

The I/F circuit 54 is connected with the operating switch 20, the touch panel 22, the speaker 32. Here, the operating switch 20 is the above-described switches 20*a*, 20*b*, 20*c*, 20*d*, 20*e*, 20L and 20R, and in response to an operation of the operating switch 20, a corresponding operation signal is input to the CPU core 42 via the I/F circuit 54. Furthermore, the coordinate position data from the touch panel 22 is input to the CPU core 42 via the I/F circuit 54. In addition, the CPU core 42 reads the sound data necessary for the game such as game music (BGM), sound effects and voices of game characters (onomatopoeic sounds), etc. from the RAM 48, and outputs it from the speaker 32 via the I/F circuit 54.

The game apparatus 10 thus configured, for example, makes it possible to enjoy a battle simulation game. At the battle simulation game, a battle takes place between an army operated by a player (own army) and an army operated by a computer player or another player (enemy army). For example, the player makes an attack against a movable object of the enemy army by moving a movable object of his/her own army (combat vehicles, fighter airplanes, battle ships, foot soldiers, etc.).

With one conventional game apparatus, a desired movable object is selected by a touch operation, and then a position to which the movable object is to be moved (target position) is selected. Thus, the movable object moves linearly from the current position to the target position. In addition, another game apparatus allows a movable object to be moved to the target position by dragging it.

By the former method, however, the desired movable object can be moved by a touch operation, but screen switching takes place in such a manner that the movable object moves simply from the current position to the desired movement position, and thus this cannot show a realistic state in which the movable object is gradually heading toward the desired movement position. More specifically, the movable object such as a combat vehicle goes linearly from the current position to the desired movement position, and thus it accomplishes its movement too easily even if there exists any obstacle on its way. In addition, according to the latter method, the movable object can be moved by dragging it in such a manner as to avoid any obstacles. However, the movement of the movable object is based on a dragging operation and cannot be started over again. As a consequence, it is required to contemplate a movement path sufficiently in advance, but it is hard to determine the path in due consideration of land features and obstacles, only at a glance through the game screen.

Thus, in this embodiment, a movement path (locus) is decided in advance according to the player's plan (strategy), and a movable object moves along the decided path. A description will be given below as to the decision of a movement path (locus) of a movable object and the movement of the movable object, by referring to game screen examples.

Figure 3:
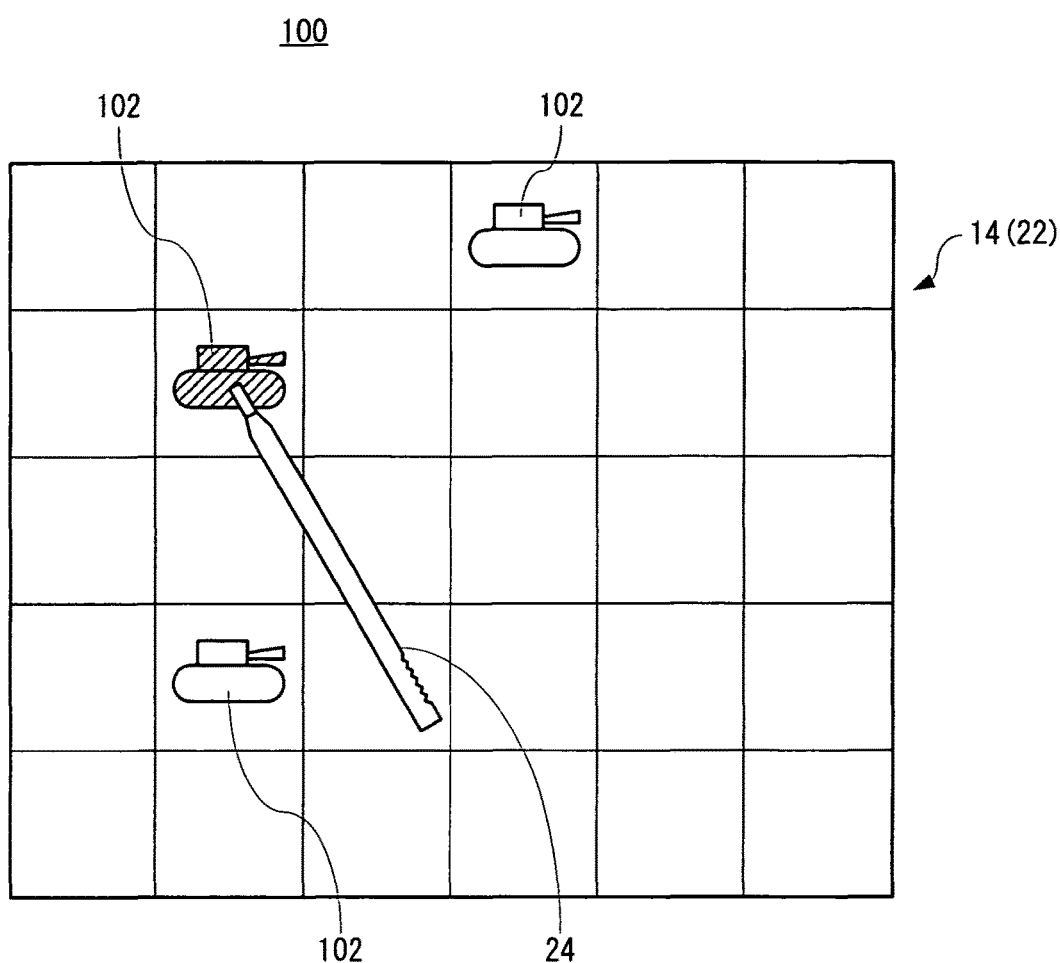
FIG. 3 is an illustrative view showing one example of game screen displayed on a second LCD provided to the game apparatus shown in FIG. 1.

FIG. 3 is an illustrative view showing one example of game screen 100 displayed on the LCD 14 of the game apparatus 10. Although not shown, the touch panel 22 is provided on the LCD 14 as stated above (the same applies to FIG. 4 to FIG. 6 and FIG. 8 to FIG. 11). The LCD 14 displays one part of the game map containing an object 102 capable of being operated by the player (the own army's player object or player character) and its vicinity or surroundings, as the game screen 100. Although not illustrated, the game screen 100 provides background objects indicative of ground (land forms), buildings, forests, the sky, the sea, etc., and also may display the enemy army's objects in some cases. Besides, the game screen 100 of FIG. 3 has a grid of squares so that the object 102 moves vertically or horizontally based on the squares. That is, in this embodiment, the object 102 does not take an oblique direction or skip any square. However, the squares may not be displayed on the actual game screen 100.

Although not illustrated, the entire game map corresponding to a game space or game level (stage) is displayed as another game screen on the LCD 12. However, the game screen displayed on the LCD 12 may offer information or parameters on the object 102 and an enemy object (not shown) (numerical values of vital power, physical strength, offensive power, level, etc.).

As shown in FIG. 3, when the player designates (touches) the object 102 with the stick 24, the touched object 102 is brought into a selected state (movable and active state). In FIG. 3, the selected state of the object 102 is shown by oblique lines (the same applies to FIG. 4 to FIG. 6, and FIG. 8 to FIG. 11). In the actual game screen 100, however, the selected state is indicated by color reversal or brightness change.

Figure 4:
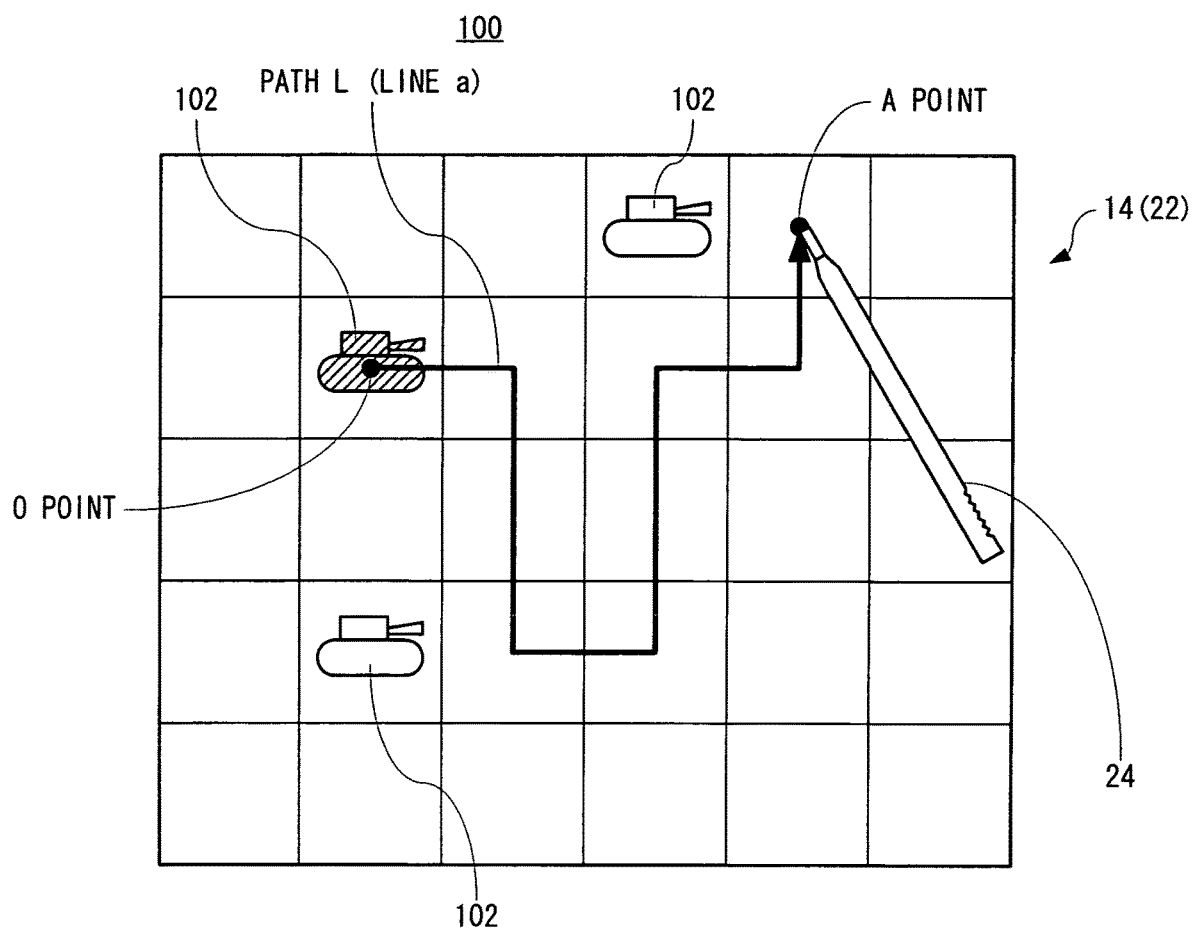
FIG. 4 is an illustrative view showing another example of game screen displayed on the second LCD of the game apparatus shown in FIG. 1.

After the desired object 102 has become in the selected state, by sliding the stick 24 directly, that is, performing a sliding operation, a locus (movement path) is drawn on the game screen 100 in accordance with the sliding. Additionally, as aforesaid, the object needs to be dragged vertically or horizontally because it moves vertically or horizontally by each square. Therefore, a movement path (hereinafter referred to as just "path") L of the object 102 can be drawn as shown in FIG. 4, for example. Moreover, when one object 102 is brought into the selected state, the position coordinates of the object 102 are set at a reference point or a start point (point O) of the path L.

Although detailed description is omitted, touch coordinates are detected at predetermined time intervals (one frame: screen update unit time (1/60 second)), and the squares including the detected touch coordinates form the path L. Thus, for a sliding operation, it is not necessarily required to slide in the center of each square. Also, since the object 102 always moves by each square in this embodiment, central coordinates of squares forming the path L are stored in chronological order (by turns), line texture is affixed so as to link those central coordinates, and the path L is displayed on the game screen 100.

As shown in FIG. 4, the player slides and moves the stick 24 from point O rightward by one square, downward by two squares, rightward by one square, upward by two squares, rightward by one square, and upward by one square, thereby drawing the path L formed by a line a. Here, when the player releases the stick 24 from the touch panel 22 (performing a touch-off operation), the path L is determined for the present.

At that time, by touching the path L at any point and then performing a touch-off operation at the same point, that is, by clicking on a desired point on the path L, the object 102 moves to the desired point (position coordinates) along the path L. In the case of clicking on some midpoint on the path L as described later, the path L is shortened down to the midpoint and the object 102 moves to the desired point (end point) along the shortened path L.

Figure 5:
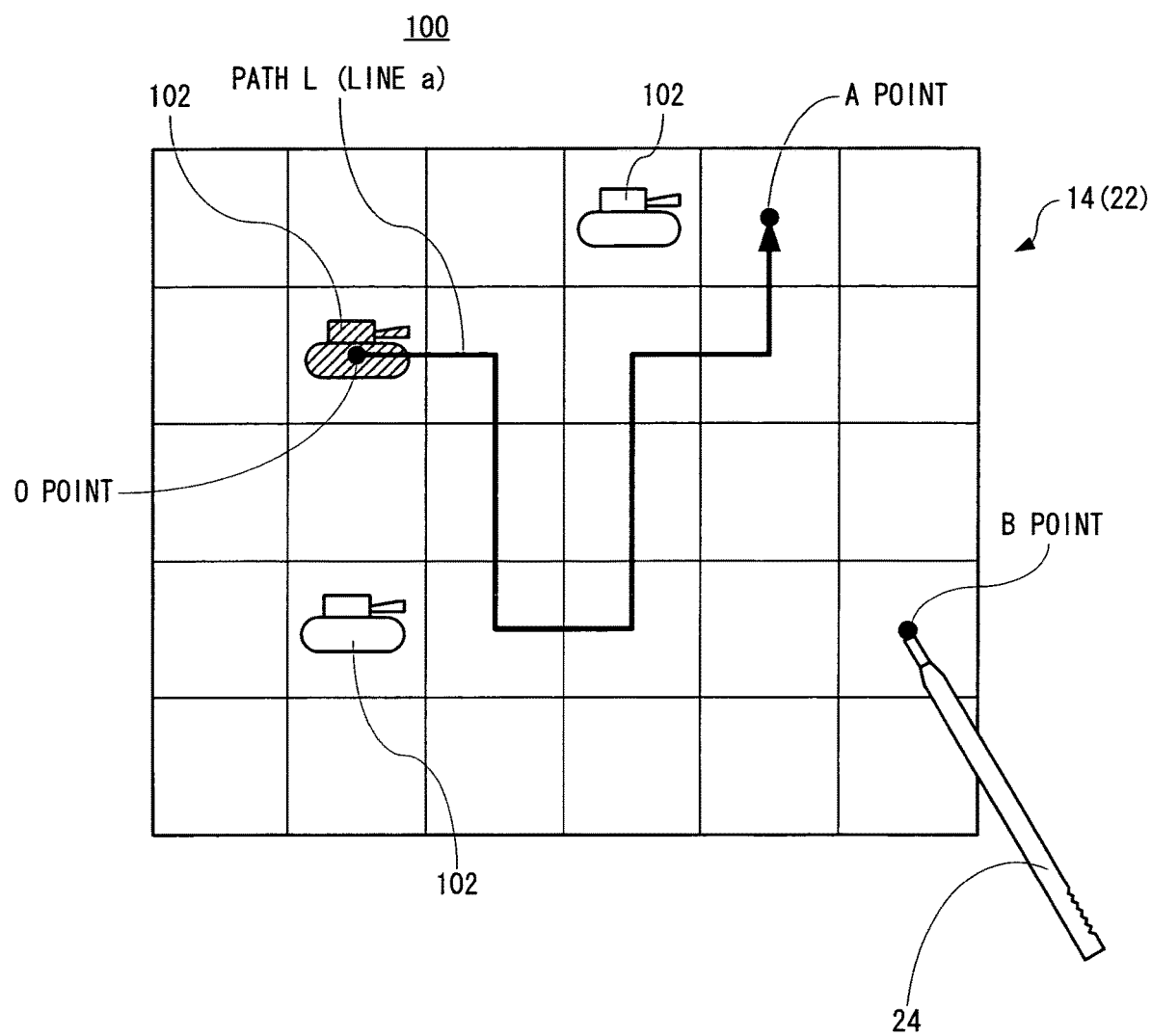
FIG. 5 is an illustrative view showing still another example of game screen displayed on the second LCD of the game apparatus shown in FIG. 1.
Figure 6:
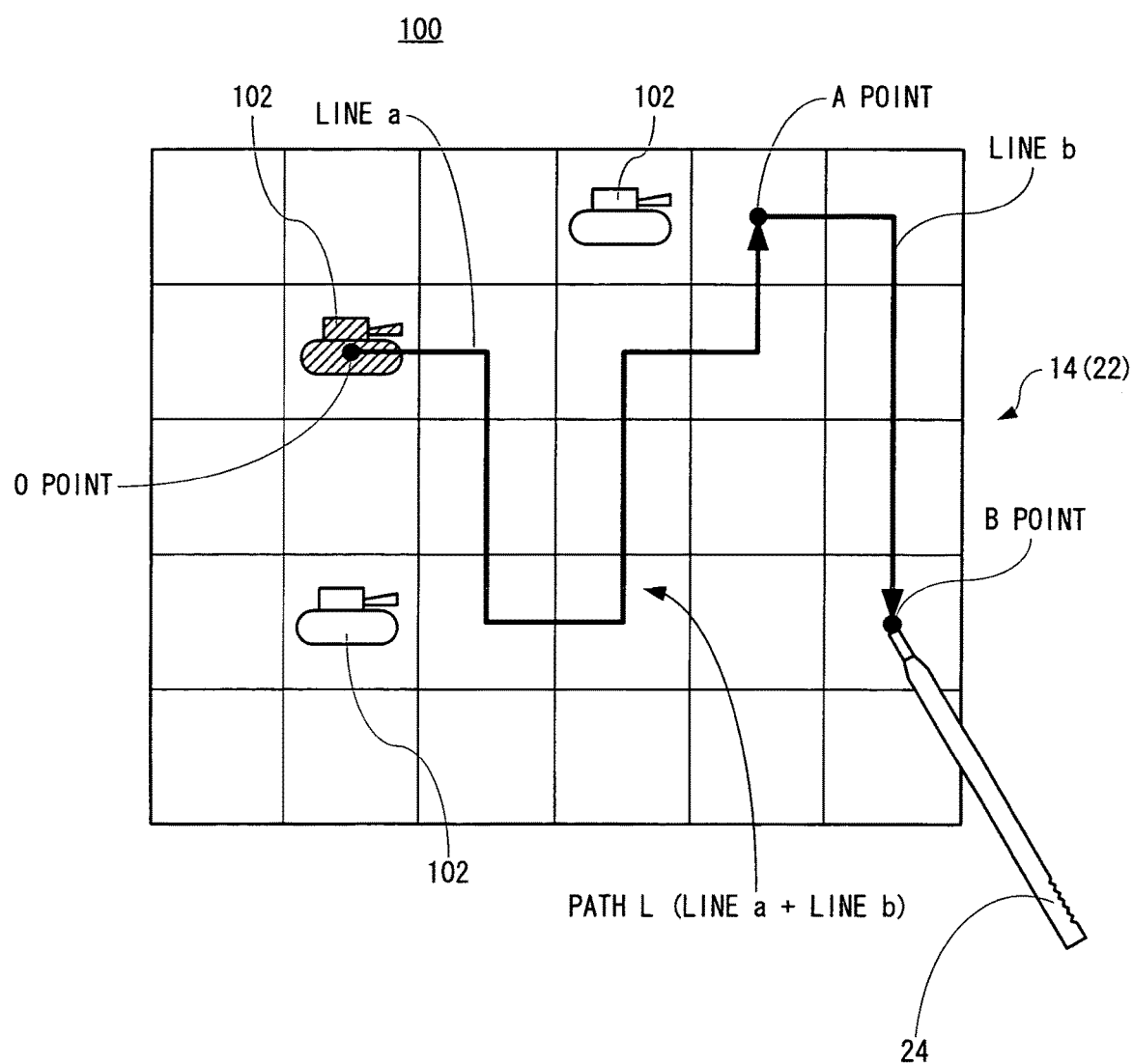
FIG. 6 is an illustrative view showing further another example of game screen displayed on the second LCD of the game apparatus shown in FIG. 1.

Additionally, the path L can be made longer. In this embodiment, it is possible to extend the path L by drawing the path L through a sliding operation, that is, by releasing the stick from the touch panel 22 and then touching some point not on the path L. More specifically, as shown in FIG. 4, by drawing the path L formed from the line a through a sliding operation, releasing the stick 24 from the touch panel 22 and then touching some point (B point) not on the path L (line a) as shown in FIG. 5, a portion to be extended (line b) is decided by random numbers and the path L is extended as indicated in FIG. 6, for example. That is, the end point (A point) of the path L is extended to the square indicated by B point in accordance with a predetermined rule using random numbers or the like.

Figure 7:
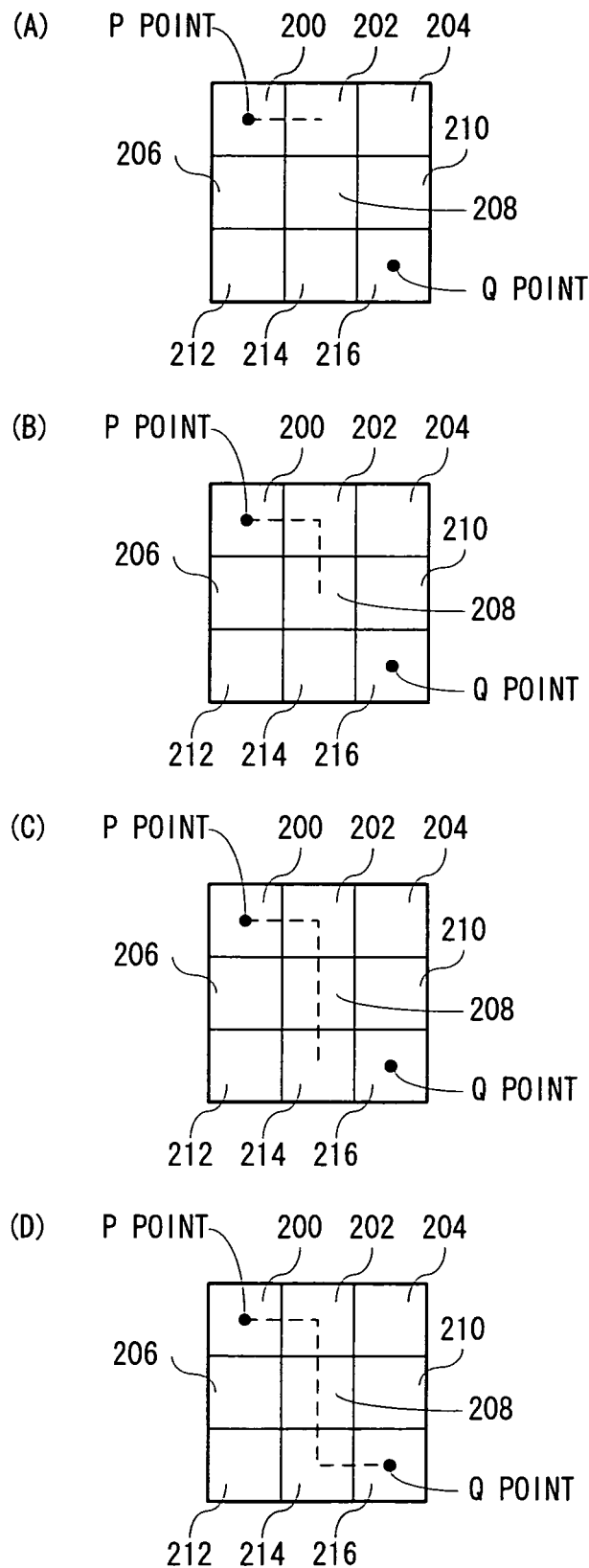
FIG. 7 is an illustrative view describing a method of deciding a path by random numbers.

Here, with the use of FIG. 7 (A) to FIG. 7 (D), a method for deciding the path L by random numbers will be described below. Referring to FIG. 7 (A), in deciding the path L from the start point (P point) to the end point (Q point), firstly, one square moved from a square 200 is decided by random numbers in such a manner as that the path L is in a direction from the square 200 toward Q point and moves vertically or horizontally. Thus, as a first square, a square 202 and a square 206 are proposed as candidates. Here, when the square 202 is selected, for example, as shown in FIG. 7 (A), a square moved by one from the square 202 is decided by random numbers in such a manner that the path L is in a direction from the square 202 to point Q and moves vertically or horizontally. Here, a square 204 and a square 208 are proposed as candidates. This procedure also applies to the description below.

As shown in FIG. 7 (B), for example, when the square 208 is selected, a square moved by one from the square 208 is decided by random numbers. Here, a square 210 and a square 214 are proposed as candidates in accordance with the aforesaid rule. As indicated in FIG. 7 (C), for example, when the square 214 is selected, a square moved by one from the square 214 is decided by random numbers. However, advancing one square here relates to the presence of a square 216 where the point Q exists as end point, and thus the square 216 is unconditionally selected. In this manner, the path L is determined by random numbers. Besides, the path L is decided in such a manner as to pass through the squares 200, 202, 208, 214 and 216 in this order. Moreover, as detailed description is omitted, when each square is selected and the path L is determined, the path L is displayed (drawn) on the game screen 100. The same applies to the following description.

In addition, although not indicated in FIG. 7 (A) to Figure (D), the squares already selected as one part of the path L and the squares where another object 102 or some obstacles exist would never be proposed as candidates for the squares to be decided by random numbers.

Figure 8:
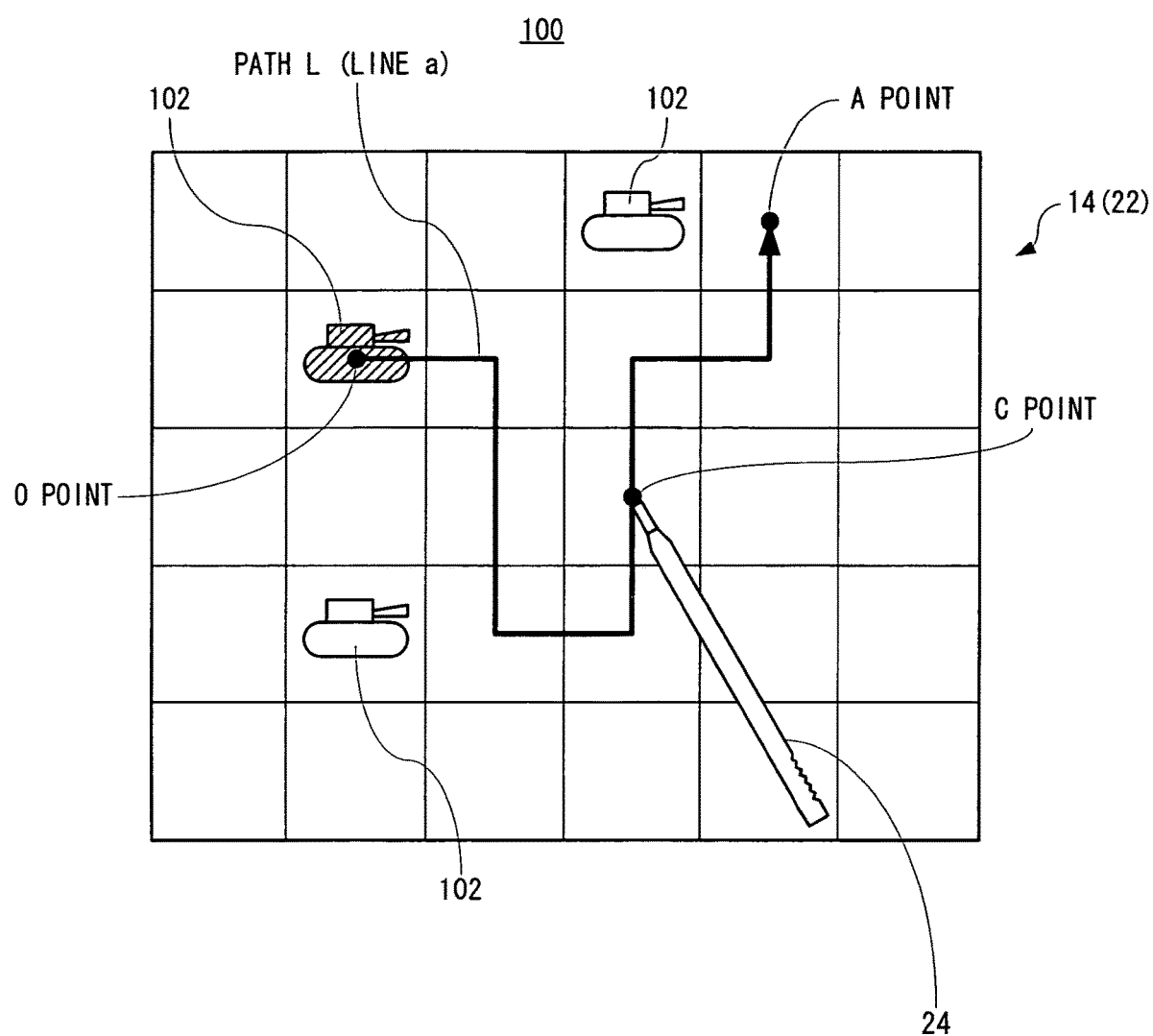
FIG. 8 is an illustrative view showing another example of game screen displayed on the second LCD of the game apparatus shown in FIG. 1.
Figure 9:
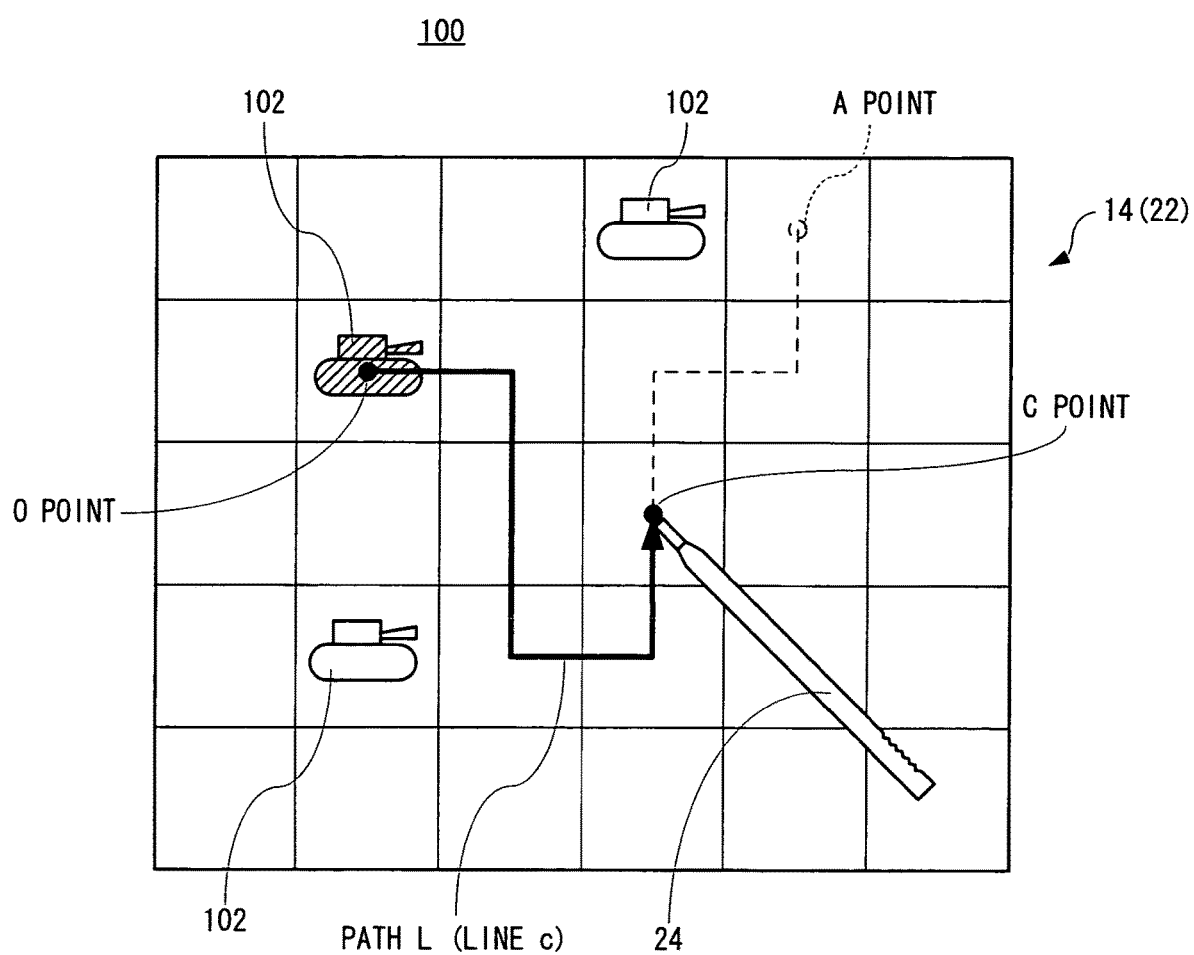
FIG. 9 is an illustrative view showing still another example of game screen displayed on the second LCD of the game apparatus shown in FIG. 1.

Furthermore, the path L may be made shorter. For example, by determining the path L as indicated in FIG. 4 and then touching some point (point C) on the path L other than the start point (point O) and the end point (point A) as shown in FIG. 8, the path L is partially erased and thus shortened as shown in FIG. 9.

If the player performs a touch-off operation, that is, the player clicks on the point C, the path L is shortened and then the object 102 moves to the point C along the path L. This takes place because the coordinates where the touch panel 22 is touched in deciding the path L (touch-on coordinates) and the coordinates where the stick 24 is released from the touch panel 22 (touch-off coordinates) matches with each other, which means that the operations of shortening the path L and designating the movement of the object 102 are input.

Alternatively, the path L may be extended by shortening the path L, that is, continuing the touch of the point C, and then performing a sliding operation. That is, it is possible to make a change to the already drawn path L. Accordingly, for example, when the player operates the stick 24 in the order shown in FIG. 4, FIG. 8, FIG. 9 and FIG. 10, the path L indicated by the line a is decided and shortened so as to be the path L indicated by the line c, and then the path L indicated by the line c+the line d is determined. In other words, it is possible to change from the path L shown in FIG.

Figure 10:
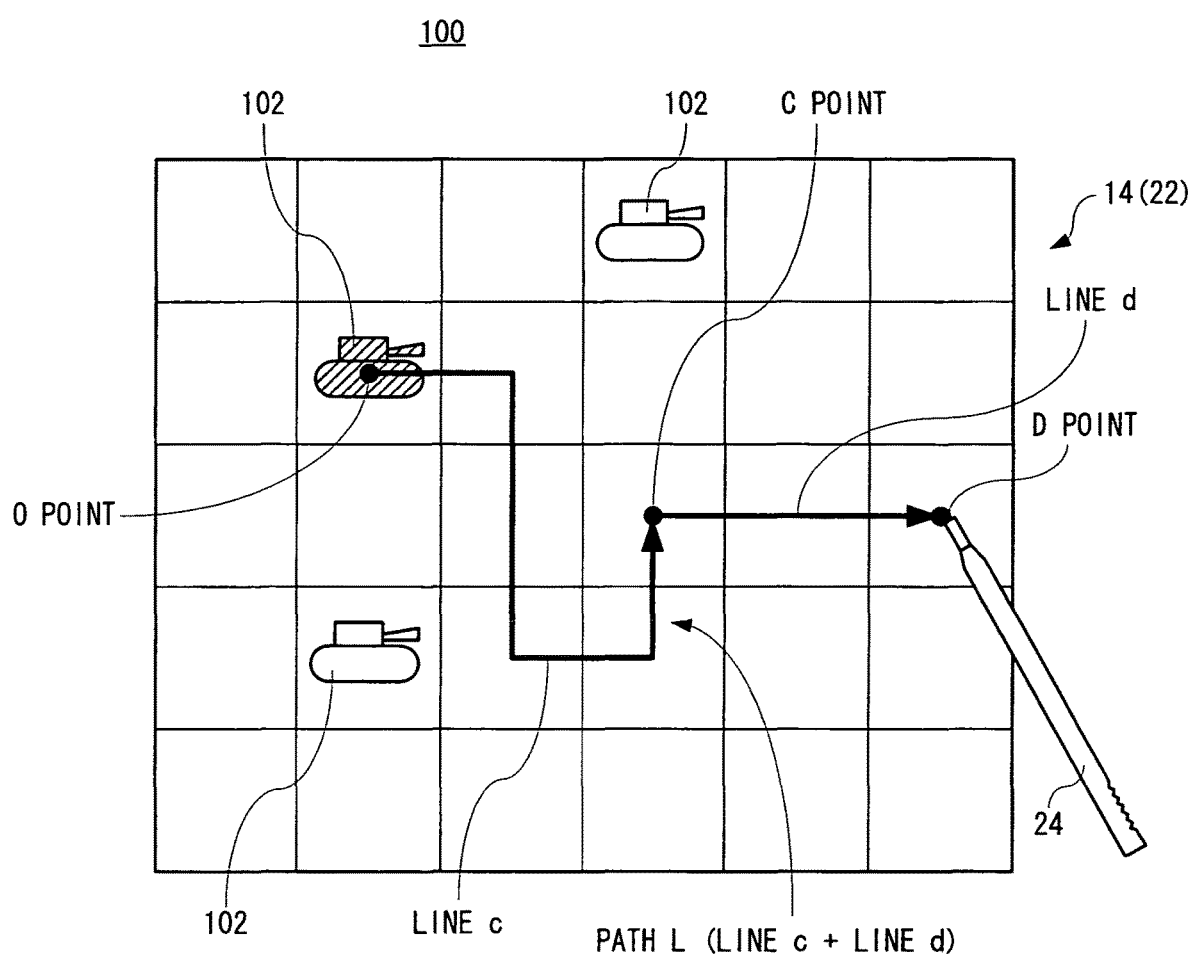
FIG. 10 is an illustrative view showing further another example of game screen displayed on the second LCD of the game apparatus shown in FIG. 1.

4 to the path L shown in FIG. 10. However, as described later, if the path L goes beyond the allowable range, a new path L is to be decided by random numbers with the point O as start point and the point D as end point.

As aforesaid, the player can draw the path L by selecting a desired object 102, deciding the movement position (target position) of the object 102 and then performing a sliding operation. Additionally, even after the path L is already determined, the player can extend or shorten and extend the path L, and also can click on some midpoint in the path L to move the object 102 partway, with reconsideration given to the target position and the path L. That is, the player can decide the path L under his/her strategy and also make a change to it easily.

Figure 11:
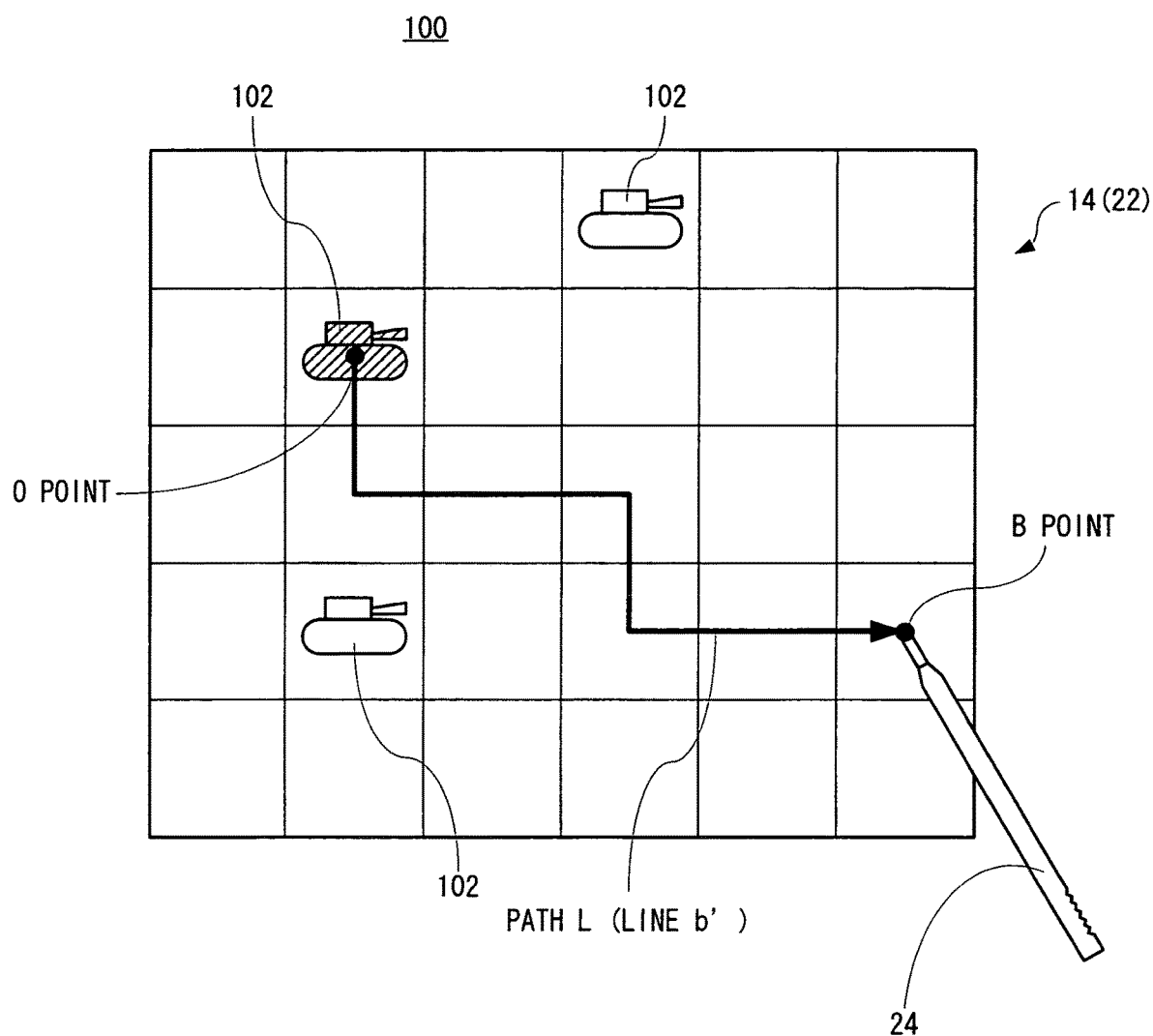
FIG. 11 is an illustrative view showing another example of game screen displayed on the second LCD of the game apparatus shown in FIG. 1.

In addition, the movable range of each object 102 (the number of squares) is predetermined, and if the number of squares corresponding to the movable range (allowable range) is outreached, the whole path L decided so far is erased and another path L is decided by random numbers with the point O as start point and the current coordinates as end point. For example, if the path L from the point O to the point B (the line a+the line b) is decided, that is, the path L is made longer, and the length of the path L exceeds the allowable range as indicated in FIG. 6, then the path L is erased and a new path L (line b') is decided with the point O as start point and the point B as end point, as shown in FIG. 11. The method for deciding the new path L is the same as described above with reference to FIG. 7 (A) or FIG. 7 (D). Although not illustrated, if the path L is drawn only through a sliding operation and the length of the path L goes beyond the allowable range, another path L is also decided by random numbers.

Besides, although not shown, if the path L is decided by random numbers and exceeds the allowable range again, it is necessary to prompt the user to change the current touch coordinates by displaying a warning message on the LCD 14 (or the LCD 12) or emitting a warning sound from the speaker 32 or doing the both.

Also, in this embodiment, the allowable range is preset for each object 102 but is limited to the preset one. The range may be set variably depending on the player's game level, the progress of the game and the object parameters (vital power, level, physical strength, etc.). Alternatively, the allowable range may be set according to the square (background object) corresponding to the current position of the object 102.

Moreover, although not illustrated, if there exist a plurality of objects 102 as indicated in FIG. 3 to FIG. 6 and FIG. 8 to FIG. 11, one selected object 102 can be deselected by clicking it again. That is, another object 102 can be selected.

Figure 12:
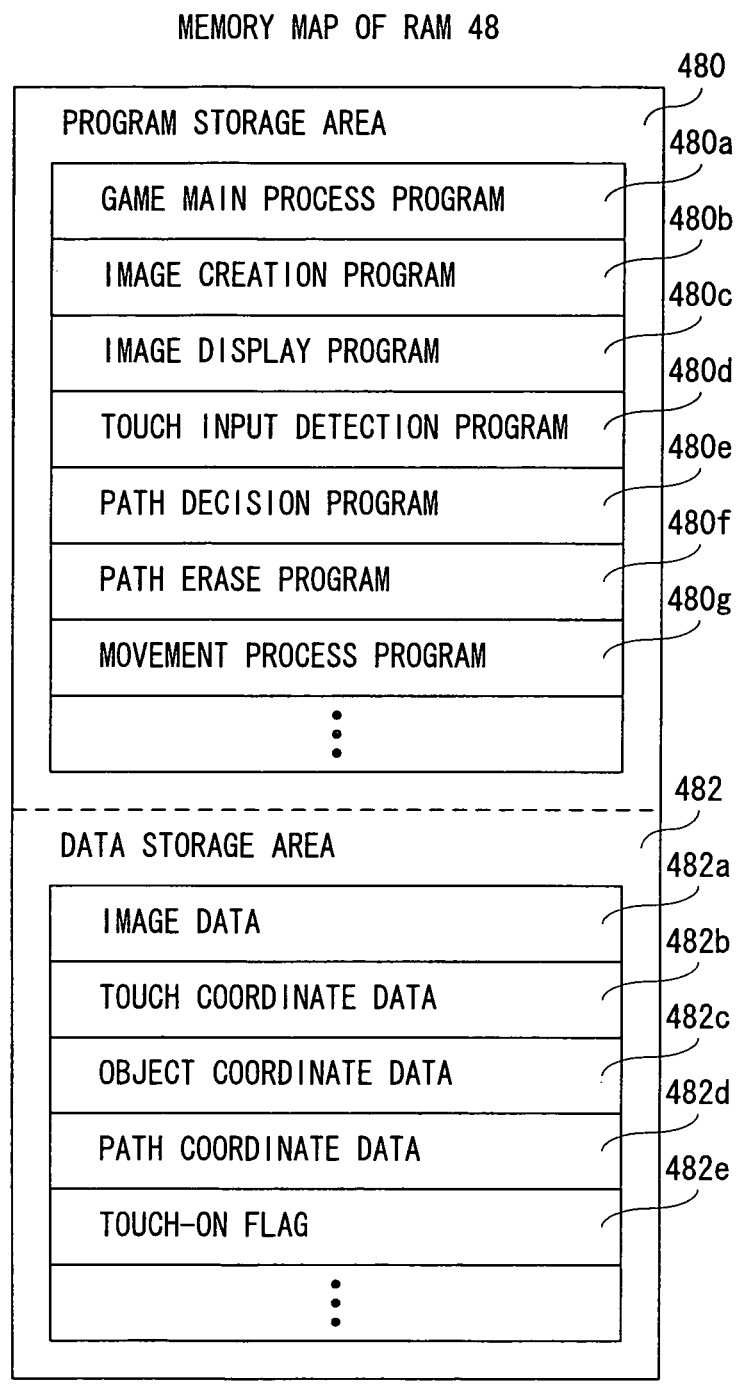
FIG. 12 is an illustrative view showing an example of a memory map of a RAM shown in FIG. 2.

FIG. 12 is an illustrative view showing one example of memory map of the RAM 48 contained in the game apparatus 10 shown in FIG. 2. Referring to FIG. 12, the RAM 48 includes a program storage area 480 and a data storage area 482. The program storage area 480 stores a game program formed by a game main process program 480a, an image creation program 480b, an image display program 480c, a touch input detection program 480d, a path decision program 480e, a path erase program 480f, a movement process program 480g, etc.

The game main process program 480a is a program for processing a main routine for a battle simulation game. The image creation program 480b is a program for creating game objects (the objects 102, the enemy objects, the background objects, etc.) and adding line or point textures such as the path L, by using image data 482a described later. The image display program 480c is a program for displaying on the LCD 12 and the LCD 14 the images created according to the image creation program 480b.

The touch input detection program 480d is a program for detecting at regular time intervals the coordinate data input from the touch panel 22 (touch coordinate data). In addition, the CPU core 42 turns on a touch-on flag 482e described later if it detects the coordinate data in accordance with the touch input detection program 480d, and turns off the touch-on flag 482e if it detects no coordinate data. The path decision program 480e is a program for deciding the path L by random numbers if the path L is to be extended, some point not in the path L is clicked, or the path L goes beyond the allowable range, as described above. The path erase program 480f is a program for erasing one part or whole of the drawn path L and/or the path L decided by random numbers if the path L exceeds the allowable range or the path L is shortened by the player. In either case, the touch coordinate data 482b associated with the erased path L is also erased. The movement process program 480g is a program for moving the selected object 102 in accordance with the decided path L.

Although not illustrated, the program storage area 480 also stores a game sound reproduction program, a backup program, etc. The game sound reproduction program is a program for reproducing sounds (music) required for the game. The backup program is a program for saving in-progress game data or result data in a memory card 28 according to the player's designation or some predetermined event.

The data storage area 482 stores the image data 482a, the touch coordinate data 482b, an object coordinate data 482c, the path coordinate data 482d, etc. The image data 482a is image data for creating game objects and the like (polygon data, texture data, etc.). The touch coordinate data 482b is data on the current coordinates detected in accordance with the touch input detection program 480d, and is updated every time touch coordinates are detected.

The object coordinate data 482c is data on the position coordinates of the operable (movable) object 102, and is stored in correspondence with each object 102. Thus, the data is updated according to the movement of the object 102, and in deciding the path L by random numbers, the position coordinates indicated by the coordinate data on the selected object 102 become the start point.

The path coordinate data 482d is a group of coordinate data on the central coordinates of the squares forming the path L drawn by the player or the path L decided by random numbers, which is stored in chronological order. Besides, when one part or whole of the path L is erased, one part or whole of the coordinate data included in the path coordinate data 482d is erased as well.

In addition, the data storage area 482 is provided with the touch-on flag 482e. The touch-on flag 482e is established (turned on) when touch input is carried out, and is not established (turned off) when no touch input is carried out. For example, the touch-on flag 482e is constructed of a one-bit register, and a data value "1" is set to the register when the flag is turned on and a data value "0" is set to the register when the flag is turned off.

Although not illustrated, the data storage area 482 also stores other kinds of data such as sound data required for the game (voice, music, sound effects, etc.), game data generated (created) with the progress of the game (in-progress data and result data) and other flag data.

Figure 13:
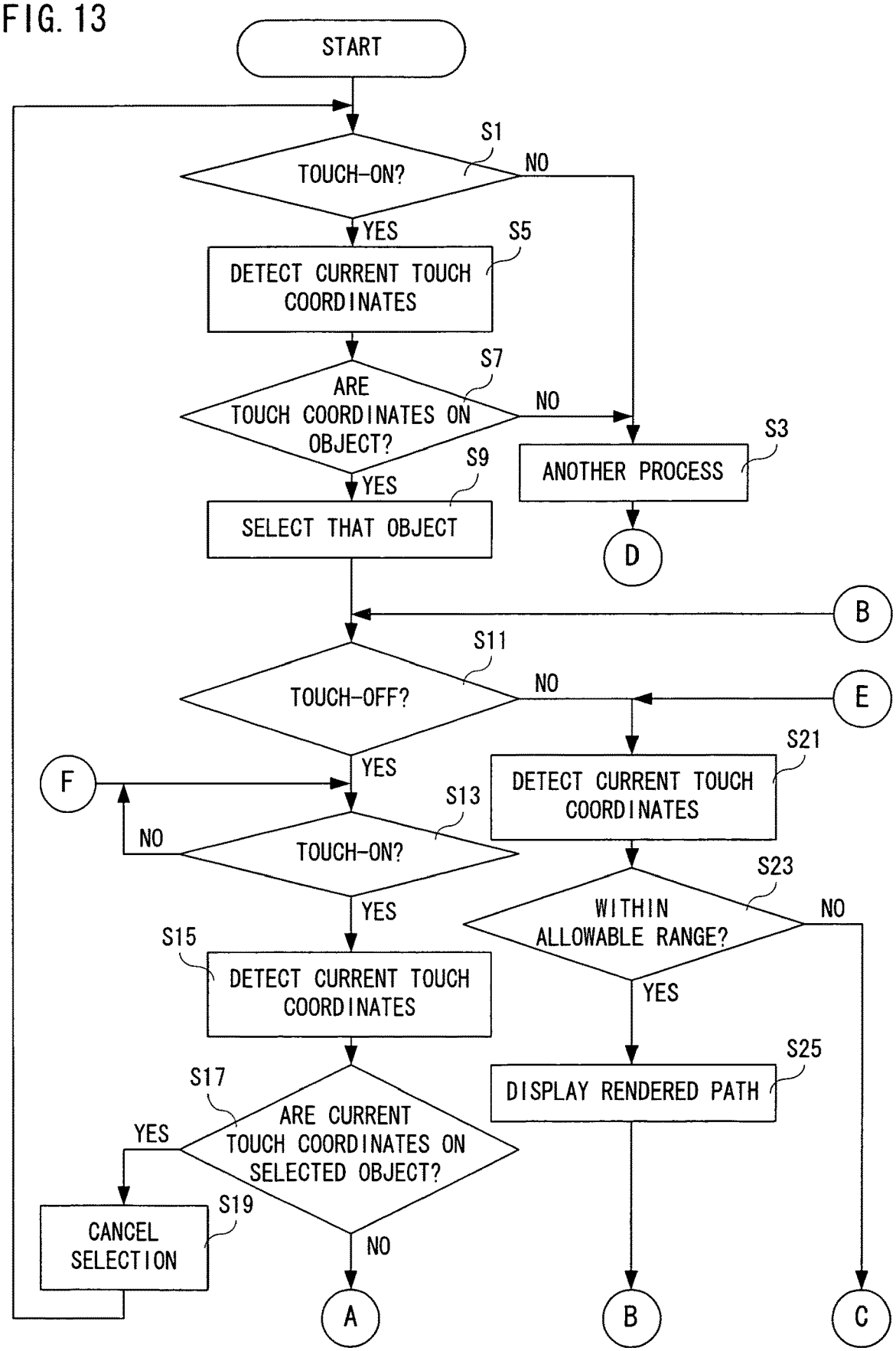
FIG. 13 is a flowchart showing one part of an object movement control process of a CPU core shown in FIG. 2.
Figure 14:
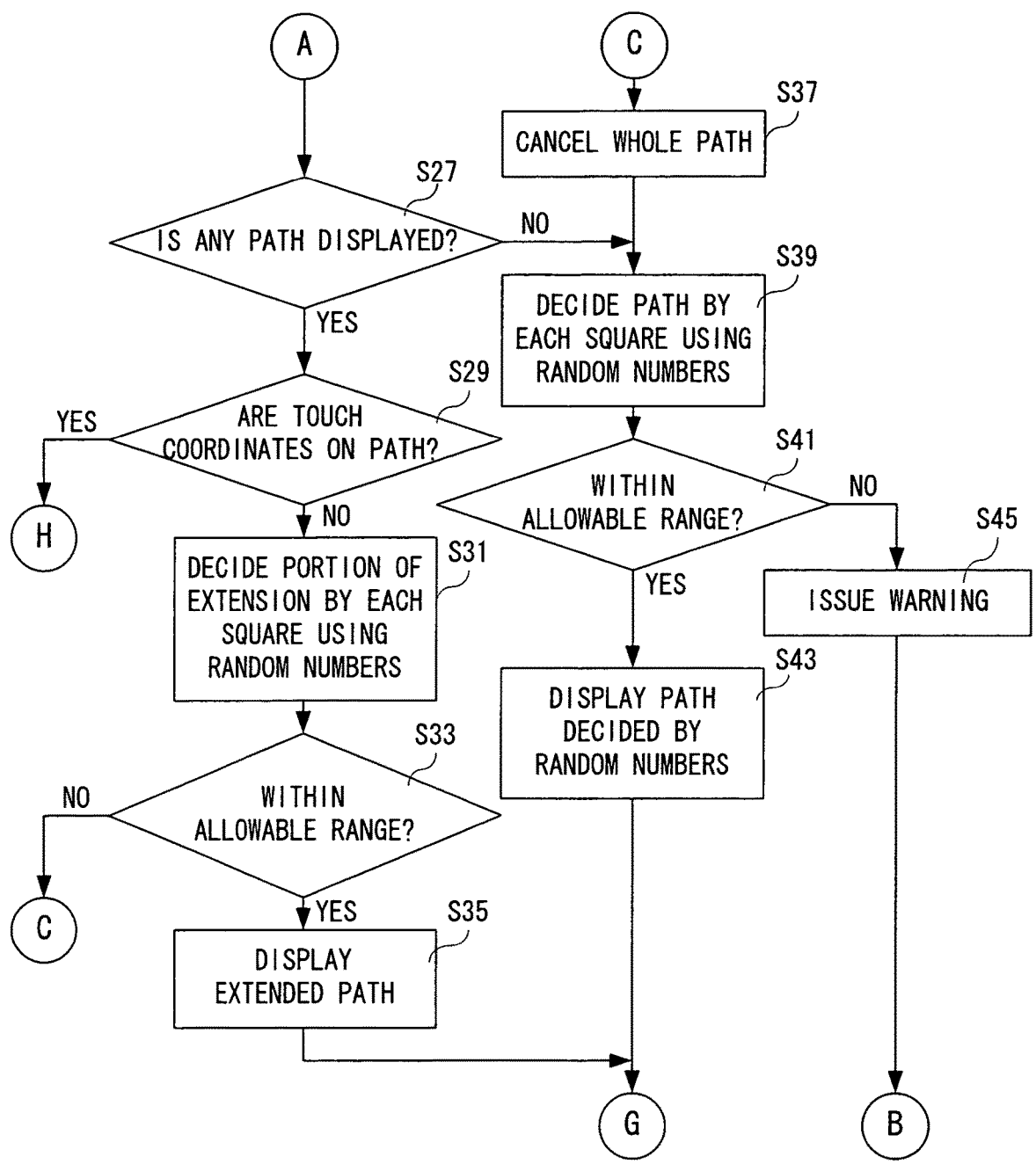
FIG. 14 is a flowchart showing another part of the object movement control process of the CPU core shown in FIG. 2 and continuing from FIG. 13.
Figure 15:
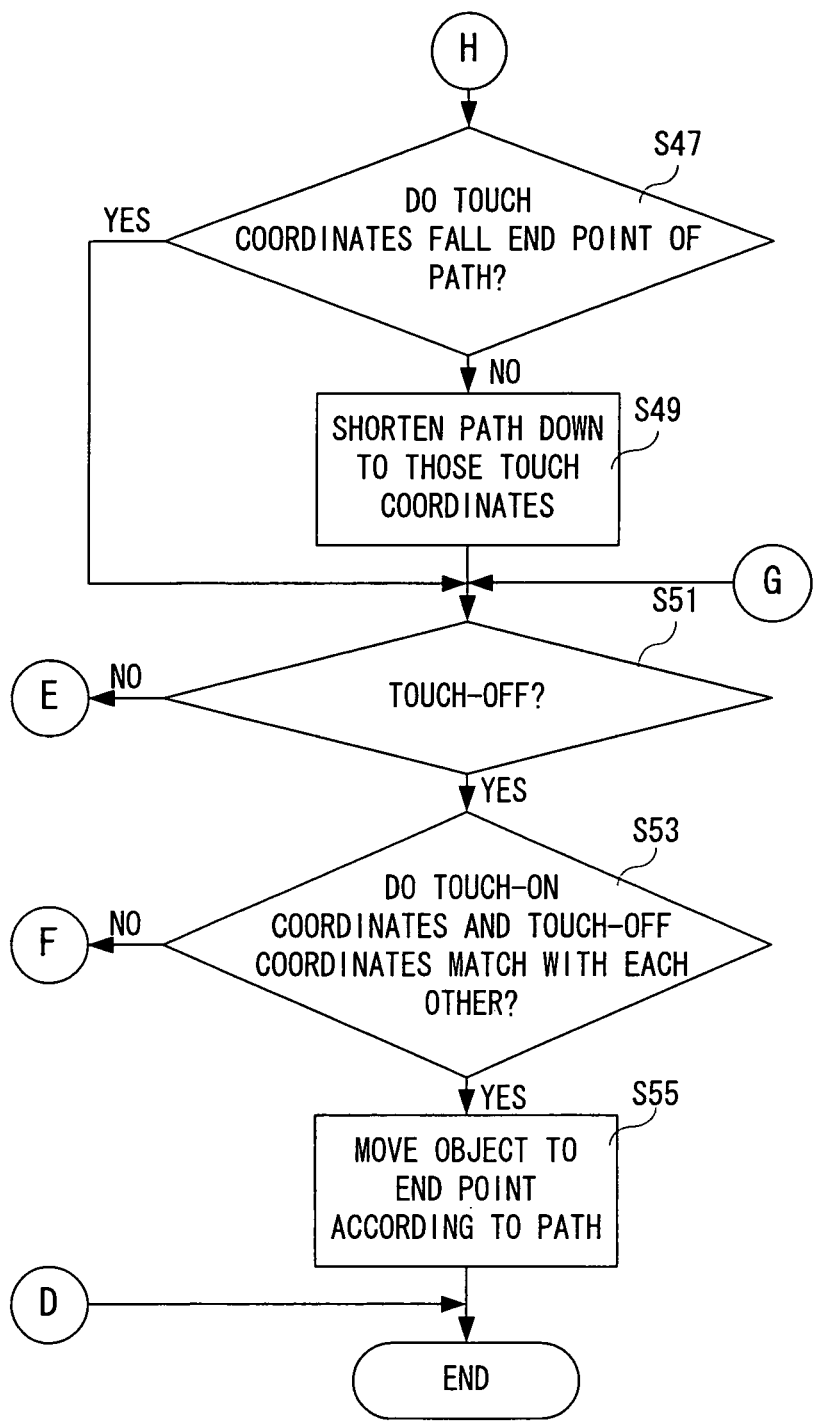
FIG. 15 is a flowchart showing still another part of the object movement control process of the CPU core shown in FIG. 2 and continuing from FIG. 13 and FIG. 14.

More specifically, the CPU core 42 shown in FIG. 2 executes the object movement control process (path L decision process and object movement process) in accordance with the flowchart indicated in FIG. 13 to FIG. 15. Although a detailed description will be omitted, the object movement control process is carried out a number of times where a movement process can be performed at the own army's turn to attack, for example. Here, the number of times where a movement process can be performed may be the total number of the own army's objects 102, the number of times variably decided according to the game level or the game progress, or the number of times preset by the game program or the game developer.

Referring to FIG. 13, when starting the object movement control process, the CPU core 42 determines in a step S1 whether any touch is given or not. Here, the CPU core 42 determines whether the touch-on flag 482*e* is turned on or not. The same applies to the following description. If "NO" in the step S1, that is, if the touch-on flag 482*e* is turned off, it is concluded that no touch is given and another process is carried out in a step S3 to end the object movement control process. For example, another process here is a screen update process for non-player object such as the movement of the enemy army's object and the change of a background.

Although not shown, by performing a process independent from the object movement control process shown in FIG. 13 to FIG. 15, the CPU core 42 detects touch coordinates and turns on/off the touch-on flag 482 at regular time intervals.

If "YES" in the step S1, that is, if the touch-on flag 482*e* is turned on, it is concluded that some touch is given, and the current touch coordinates are detected in a step S5. Here, the CPU core 42 refers to the data storage area 482 to detect the current (latest) coordinate data from the touch coordinate data 482*b*. Although not shown, when detecting touch coordinates at regular time intervals as described above, the CPU core 42 stores the coordinate data corresponding to the touch coordinates in the data storage area 482 in chronological order. This allows the touch coordinate data 482*b* to be updated. The same applies to the following description.

In a succeeding step S7, it is determined whether or not the detected (current) touch coordinates are on the object 102. If "NO" in the step S7, that is, if the detected touch coordinates are not on the object 102, the process advances directly to the step S3. However, if "YES" in the step S7, that is, if the detected touch coordinates are on the object 102, the object is brought into a selected state in a step S9. In a succeeding step S11, it is determined whether a touch-off operation is performed or not. Here, it is determined whether the touch-on flag 482*e* is turned off or not.

If "YES" in the step S11, that is, if the touch-on flag 482*e* is turned off, it is concluded that the selection of the object 102 or the sliding operation is ended, and then it is determined in a step S13 whether any touch is given or not. If "NO" in the step S13, that is, if a touch-off operation has been performed, the process returns to the same step S13. However, if "YES" in the step S13, that is, if some touch is given, the current touch coordinates are detected in a step S15.

Then, in a step S17, it is determined whether or not the current touch coordinates are on the selected object 102. Here, it is determined whether or not the coordinates (dot) on the LCD 14 corresponding to the touch coordinates are contained in the display area of the selected object 102. If "NO" in the step S17, that is, if the current touch coordinates are not on the selected object 102, the process moves to a step S27 shown in FIG. 14. However, "YES" in the step S17, that is, if the current touch coordinates are on the selected object 102, the selected object 102 is deselected (canceled) in a step S19 and then the process returns to the step S1. In this case, the player can select another object 102 and execute the movement process, for example.

On the other hand, if "NO" in the step S11, that is, if some touch is given, the current touch coordinates are detected in a step S21. Here, although not shown, the square containing the selected touch coordinates is detected and the coordinate data corresponding to the central coordinates in the square is sequentially stored in chronological order, as described earlier. In other words, the path coordinate data 482*d* is updated. Subsequently, in a step S23, it is determined whether or not the path L is within the allowable range. Here, it is determined whether or not the length (number of squares) of the path L decided by drawing at the present moment (at the current position of the touch coordinates) is within the allowable range of the selected object 102. If "NO" in the step S23, that is, that is, if the length of the decided path L is out of the allowable range, the process goes to a step S37 shown in FIG. 14. However, if "YES" in the step S23, that is, if the length of the decided path L is within the allowable range, the drawn path L is displayed in a step S25, and then the process returns to the step S11. By repeating the steps S11, S21, S23 and S25, the path L is drawn in accordance with the player's sliding operation.

As stated above, if it is found in the step S17 that the current touch coordinates are not on the selected object 102, it is determined in the step S27 shown in FIG. 14 whether some path L is currently displayed or not. Here, the CPU core 42 refers to the RAM 48 to determine whether the path coordinate data 482*d* is stored or not. If "NO" in the step S27, that is, if no path L is currently displayed, it is concluded that the path L is being decided by so-called two-point clicking (clicking on one position and then another), and then the process advances to a step S39. However, if "YES" in the step S27, that is, if some path L is currently displayed, it is determined in a step S29 whether the current touch coordinates detected in the step S15 is on the path L or not. In actuality, however, a certain degree of error range (several dots) is provided because too strict a determination on the touch of the path L might make the player misconstrue this as a failure of the game apparatus 10 or the like.

If "YES" in the step S29, that is, if the current touch coordinates are on the path L, the process moves to a step S47 shown in FIG. 15. However, if "NO" in the step S29, that is, if the current touch coordinates are not on the path L, it is concluded that the path L is being extended, and a portion of the extension is decided by each square through the use of random numbers in a step S31. In this case, the portion between the end point of the already displayed path L and the current touch coordinates is decided by random numbers. Then, it is determined in a step S33 whether the length of the extended path L is within the allowable range. If "NO" in the step S33, that is, if the length of the extended path L is out of the allowable range of the selected object 102, the process goes to the step S37. However, if "YES" in the step S33, that is, if the length of the path L falls within the allowable range, the extended path L is displayed in a step S35, and the process advances to a step S51 shown in FIG. 15.

In addition, as stated above, if the current touch coordinates falls outside the allowable range or if the length of the path L extended in the step S33 is out of the allowable range of the selected object 102, the whole path L currently displayed is canceled in the step S37. That is, the path coordinate data 482*d* is all erased. In the succeeding step S39, a new path L is decided by each square through the use of random numbers. The manner of the decision is as described above with reference to FIG. 7(A) to FIG. 7(D). If the whole path L is canceled in the step S37, a new path L is decided by random numbers with the position coordinates of the selected object 102 as start point and the current touch coordinates as end point. However, if some desired point is clicked after the path L has been drawn through a sliding operation, the portion of extension is decided by using random numbers with the end point of the drawn path L as start point and the clicked point as end point. Although not illustrated, the process of step S39 allows the path coordinate data 482d to be updated.

In a succeeding step S41, it is determined whether or not the length of the path L decided by random numbers falls within the allowable range of the selected object 102. If "YES" in the step S41, that is, if the decided path L is within the allowable range, the decided path L is displayed in a step S43 and then the process advances to the step S51 shown in FIG. 15. However, if "NO" in the step S41, that is, if the decided path L falls outside the allowable range, a warning is given in a step S45 and then the process returns to the step S11 shown in FIG. 13. In the step S45, for example, a message is displayed or a warning sound is emitted or the both are done in order to notify the player that the length of the path L exceeds the allowable range of the selected object 102 and prompt him/her to change the current touch coordinates.

In the step S47 shown in FIG. 15, it is determined whether or not the current touch coordinates detected in the step S15 are located at the end point of the path L. That is, it is determined whether or not the coordinate data corresponding to the current touch coordinates matches the coordinate data corresponding to the end point of the path coordinate data 482d. In actuality, however, a certain degree of error range (several dots) is provided because too strict a determination on the touch of the same coordinates (dot) might make the player misconstrue this as a failure of the game apparatus 10 or the like.

If "YES" in the step S47, that is, if the current touch coordinates are located at the end point of the path L, the process moves directly to the step S51. However, if "NO" in the step S47, that is, if the current touch coordinates are not located at the end point of the path L, that is, if the current touch coordinates are located at some midway point in the path L, the path L is shortened down to the touch coordinate in a step S49 and then the process goes to the step S51. That is, in the step S49, the data on the coordinates contained in the squares of the end point to the current touch coordinates is deleted from the path coordinate data 482d. Accordingly, as depicted in FIG. 8 and FIG. 9, the path L is displayed in a shortened state.

In the step S51, it is determined whether a touch-off operation has been performed or not. If "NO" in the step S51, that is, if the touch is given, the process returns directly to the step S21 shown in FIG. 13. On the other hand, if "YES" in the step S51, that is, if a touch-off operation has been performed, it is determined in a step S53 whether or not the touch-on coordinates (the touch coordinates detected in the step S15) and the touch-off coordinates (the touch coordinates detected until just before it was found in the step S51 that a touch-off operation was performed) match with each other. That is, it is determined whether a click is given or not.

If "NO" in the step S53, that is, if the touch-on coordinates and the touch-off coordinates do not match with each other, it is concluded that the path L is extended or changed, and then the process returns to the step S13 shown in FIG. 13. However, if "YES" in the step S53, that is, if the touch-on coordinates and the touch-off coordinates match with each other, it is concluded that the movement of the object 102 is designated, the object is moved in a step S55 to the end point (the clicked point) along the path L, thereby terminating the object movement control process.

For the sake of simplicity, the object movement control process makes it possible to select the object 102 whenever the touch-on coordinates are on the object 102. Alternatively, in the case where the object 102 can be moved only once at each turn to attack, it may be then determined whether the object 102 is selectable or not. In this case, if it is selectable, the object 102 indicated by the touch-on coordinates may be selected, and if it is not selectable, a warning for selection of another object 102 may be issued to prompt the player to select another object 102.

According to this embodiment, the player can decide the path of an object according to his/her strategy, by drawing and modifying the path through a touch operation or by deciding the path through the use of random numbers. That is, the player can move the object under his/her strategy. Also, the player can easily devise his/her strategy because he/she can draw a desired path and make a change to the target position or the path as required, or deciding them at random.

Moreover, a path is decided on a square-by-square basis in this embodiment because an object is to be moved by each square, and alternatively, the path may be decided in the unit of display of the path (the minimum unit is 1 dot).

Besides, an object can be moved horizontally and vertically in this embodiment, and alternatively, it may be moved in an oblique direction.

Furthermore, in this embodiment, if a path exceeds its allowable range while it is being drawn, the whole path drawn so far is to be canceled. As an alternative to that, the portion of the path drawn within the allowable range may be left as it is.

Additionally, in this embodiment, the selected object is deselected by clicking it again, and alternatively, the selected object may be deselected by clicking on some point outside the allowable range of the selected object. On this occasion, if some path is being drawn for the object to be deselected, the whole path is also canceled.

Also, two LCDs are provided in this embodiment, and alternatively, it is possible to provide at least one LCD and set a touch panel on the LCD. Otherwise, a touch panel may be provided on each of the two LCDs so as to selectively switch between their screens.

Moreover, a touch panel is used as a pointing device in this embodiment, and alternatively, another pointing device may be employed such as computer mouse, track ball and touch pad. However, in using another pointing device, it is necessary to display an indicative image, such as a mouse pointer, on the game screen.

Although certain exemplary embodiments have been described and illustrated in detail, it is clearly understood that the same is by way of illustration and example only and is not to be taken by way of limitation, the spirit and scope of certain exemplary embodiments being limited only by the terms of the appended claims.

What is claimed is:

1. An object movement control apparatus, comprising:
   a display for displaying a movable object;
   a touch panel provided in relation to said display;
   one or more computer processors, configured to perform:
   input detection for detecting an input coordinates position entered by said touch panel;

drawn locus creation for creating a first locus based on input coordinates positions continuously detected by said input detection according to a slide operation on said touch panel by a user;

locus extension for extending, when detecting by said input detection a predetermined touch operation that a touch off is performed after said slide operation, and then, a touch on is performed at a position excluding said first locus, said first locus so that said first locus comprises a segment from the position of said touch off to the position of said touch on after creation of the first locus by said locus creation; and object movement for moving said movable object according to said first locus extended by said locus extension, wherein said movable object moves along the extended first locus on said touch panel provided on said display.

2. The object movement control apparatus according to claim 1, wherein said locus extension extends said first locus in accordance with a predetermined rule.

3. The object movement control apparatus according to claim 1, the one or more computer processors further configured to perform:

allowable movement range determination for determining whether or not said first locus extended by said locus extension exceeds an allowable movement range decided by predetermined information; and locus decision for deciding a second locus which is different from said first locus and links a start point of said first locus and said desired position in accordance with a predetermined rule when said first locus extended by said locus extension exceeds said allowable movement range.

4. The object movement control apparatus according to claim 3, wherein said predetermined information includes one of a kind of said movable object, a predetermined parameter concerning with said movable object and a kind of a background object corresponding to a current position of said movable object.

5. The object movement control apparatus according to claim 3, the one or more computer processors further configured to perform:

locus erase for erasing said first locus when said locus decision decides said second locus.

6. The object movement control apparatus according to claim 1, wherein a plurality of said movable objects are displayed on said display, and a current position of one said movable object out of said plurality of said movable objects, said one movable object being selected by the touch operation by the user is a start point of said first locus, and said object movement moves said one movable object being selected according to said first locus extended by said locus extension.

7. A non-transitory storage medium for storing an object movement control program for an object movement control apparatus comprising a display for displaying a movable object and a touch panel provided in relation to said display, wherein said object movement control program causes one or more computer processors of said object movement control apparatus to execute:

input detection for detecting an input coordinates position entered by said touch panel;

drawn locus creation for creating a first locus based on input coordinates positions continuously detected by said input detection according to a slide operation on said touch panel by a user;

locus extension for extending, when detecting by said input detection a predetermined touch operation that a touch off is performed after said slide operation, and then, a touch on is performed at a position excluding said first locus, said first locus so that said first locus comprises a segment from the position of said touch off to the position of said touch on after creation of the first locus by said locus creation; and object movement for moving said movable object according to said first locus extended by said locus extension, wherein said movable object moves along the extended first locus on said touch panel provided on said display.

8. An object movement control method for an object movement control apparatus comprising a display for displaying a movable object, a touch panel provided in relation to said display and an input detection unit for detecting an input coordinates position entered by said touch panel, including:

(a) creating a first locus based on input coordinates positions continuously detected by said input detection unit according to a slide operation on said touch panel by a user;

(b) extending, when detecting by said input detection a predetermined touch operation that a touch off is performed after said slide operation, and then, a touch on is performed at a position excluding said first locus, said first locus so that said first locus comprises a segment from the position of said touch off to the position of said touch on after creation of the first locus in (a); and (c) moving said movable object according to said first locus extended in (b), wherein said movable object moves along the extended first locus on said touch panel provided on said display.

* * * * *